(12) United States Patent
Casares et al.

(10) Patent No.: US 9,390,410 B2
(45) Date of Patent: Jul. 12, 2016

(54) AUTOMATED TRANSACTION SYSTEM AND SETTLEMENT PROCESSES

(75) Inventors: Wenceslao Casares, Woodside, CA (US); Federico H. Murrone, Buenos Aires (AR); Meyer Malka, Menlo Park, CA (US)

(73) Assignee: Lemon, Inc., Tempe, AZ (US)

( * ) Notice: Subject to any disclaimer, the term of this patent is extended or adjusted under 35 U.S.C. 154(b) by 36 days.

(21) Appl. No.: 13/031,173

(22) Filed: Feb. 18, 2011

(65) Prior Publication Data

US 2011/0202415 A1  Aug. 18, 2011

Related U.S. Application Data

(60) Provisional application No. 61/305,925, filed on Feb. 18, 2010, provisional application No. 61/373,205, filed on Aug. 12, 2010.

(51) Int. Cl.
G06Q 20/20 (2012.01)
G06Q 30/06 (2012.01)
G06Q 30/02 (2012.01)

(52) U.S. Cl.
CPC .............. G06Q 20/20 (2013.01); G06Q 20/204 (2013.01); G06Q 30/06 (2013.01)

(58) Field of Classification Search
USPC ............ 705/14, 16, 30, 44, 50, 17, 37, 14.36, 705/14.366
See application file for complete search history.

(56) References Cited

U.S. PATENT DOCUMENTS

| | | | | |
|---|---|---|---|---|
| 7,295,992 B2 * | 11/2007 | Villaret | .................. | G06Q 20/04 705/14.27 |
| 7,483,858 B2 * | 1/2009 | Foran | ..................... | G06Q 20/02 705/39 |
| 7,499,889 B2 * | 3/2009 | Golan | .................... | G06Q 20/04 705/40 |
| 2008/0052235 A1 * | 2/2008 | Mascavage | ............ | G06Q 20/02 705/44 |
| 2009/0006212 A1 * | 1/2009 | Krajicek | ................ | G06Q 20/12 705/14.35 |
| 2009/0119190 A1 * | 5/2009 | Realini | .................. | G06Q 20/04 705/30 |

* cited by examiner

*Primary Examiner* — Scott Zare
*Assistant Examiner* — Reva R Danzig
(74) *Attorney, Agent, or Firm* — Baker & McKenzie LLP

(57) ABSTRACT

Disclosed is a mobile platform that enables unique tap-and-connect transaction processing and settlement, which allows consumers, merchants, financial institutions and other third parties to strengthen their relationships through a local transaction network that offers more efficient transaction processing and settlement for reduced per-transaction cost and risk management costs and increased security.

8 Claims, 17 Drawing Sheets

| ACCOUNT | PURPOSE(S) | IN-FLOWS | OUT-FLOWS |
|---|---|---|---|
| 2402 TRANSACTION SETTLEMENT ACCOUNT (TSA) | • A "PASS THROUGH" ACCOUNT; HOLDS FUNDS IN THE PROCESS OF SETTLEMENT BETWEEN TIMES OF MEMO POSTING AND BATCH SETTLEMENT | • INTRA-DAY FLOWS TO BE SETTLED LATER IN BATCH (FROM CONSUMER DDA OR BRA) | • DAILY BATCH SETTLEMENTS (ACCUMULATED FUNDS DISTRIBUTED TO MERCHANT DDA, BFA, AND ATSA) |
| 2404 BANK FEES ACCOUNT (BFA) | • HOLDS FI PER TRANSACTION REVENUE<br>• SOURCE FOR MONTHLY FI INVOICE COLLECTION | • ISSUE FEES FROM CONSUMER TRANSACTIONS<br>• ACCEPTING FEES FROM BUSINESS TRANSACTIONS | • MONTHLY FI INVOICE FEES |
| 2406 AUTOMATED TRANSACTION SYSTEM ACCOUNT (ATSA) | • HOLDS AUTOMATED TRANSACTION SYSTEM PER TRANSACTION REVENUE<br>• HOLDS AUTOMATED TRANSACTION SYSTEM PERIODIC INVOICE REVENUE<br>• HANDLES OPEN-LOOP IMBALANCES | • AUTOMATED TRANSACTION SYSTEM PER TRANSACTION FEES<br>• AUTOMATED TRANSACTION SYSTEM PERIODIC FI INVOICE FEES<br>• AUTOMATED TRANSACTION SYSTEM PERIODIC MERCHANT INVOICE FEES<br>• AMOUNTS TO FLOW OUT OF ISSUING FI DURING OPEN-LOOP TRANSACTIONS | • AMOUNTS TO FLOW INTO ACCEPTING FI DURING OPEN-LOOP TRANSACTIONS |
| 2408 BANK REWARDS ACCOUNT (BRA) | • SOURCE FOR FI-FUNDED REWARD REDEMPTION | • PERIODIC FUNDING BY FI | • VALUE OF CONSUMER FI REWARDS REDEMPTIONS |

*FIG. 24*

AUTOMATED TRANSACTION SYSTEM AND SETTLEMENT PROCESSES

CROSS REFERENCE TO RELATED APPLICATIONS

This application relates and claims priority to U.S. Prov. Pat. App. 61/305,925 entitled, "Automated transaction system," to Casares and to U.S. Prov. Pat. App. 61/373,205 entitled, "Settlement processes in an automated payments system," to Casares et al., which are both incorporated by reference herein for all purposes.

TECHNICAL FIELD

The disclosed embodiments relate generally to automated transactions and, more specifically, to both an automated transaction system including wireless and contactless transactions on a network and to settlement processes in an automated transaction system.

BACKGROUND

Current transaction processing and settlement systems, including those of the national payment transaction networks operating on global systems, are dominated by large processors, financial institutions, and third parties. These networks can be expensive to utilize and do not offer robust security.

SUMMARY

This disclosure relates to a transaction service facilitating fast, efficient, and secure transactions. The transaction service may be used by consumers, merchants, financial institutions, and other third parties located in the same geographic region, but may be easily adapted to other systems. The transaction service is designed to reduce per-transaction costs, enabling the development of relationships between consumers, merchants, financial institutions, and other third parties, enabling real-time processing, and enabling a rich communication channel including rewards, coupons, marketing functionality, etc.

This disclosure also relates to settlement processes in an automated transaction service facilitating fast, efficient, and secure transactions. The settlement process may be initiated by the automated transaction service to settle accounts between consumers, merchants, and financial institutions after a transaction takes place over a transaction network.

This disclosure also relates to fraud prevention over a transaction processing and settlement network.

This disclosure also relates to a dynamic identification for consumers and merchants using a transaction processing and settlement network system.

This disclosure also relates to confirmation of transactions or payments, verification of transactions or payments, and other communications between a point of sale device and a consumer.

BRIEF DESCRIPTION OF THE DRAWINGS

Reference is now made to the following detailed description of the preferred embodiments, taken in conjunction with the accompanying drawings. It is emphasized that various features may not be drawn to scale. In fact, the dimensions of various features may be arbitrarily increased or reduced for clarity of discussion. In addition, it is emphasized that some components may not be illustrated for clarity of discussion.

FIG. 24 is a table illustrating various accounts in the automated transaction system, in accordance with the present disclosure;

DETAILED DESCRIPTION

The automated transaction system allows consumers, merchants, financial institutions, and other third parties to strengthen their relationships through a local transaction network that offers more efficient transaction processing and settlement for reduced per-transaction cost and risk management costs; increased security; and rich, targeted rewards and loyalty offers.

Figure 1:
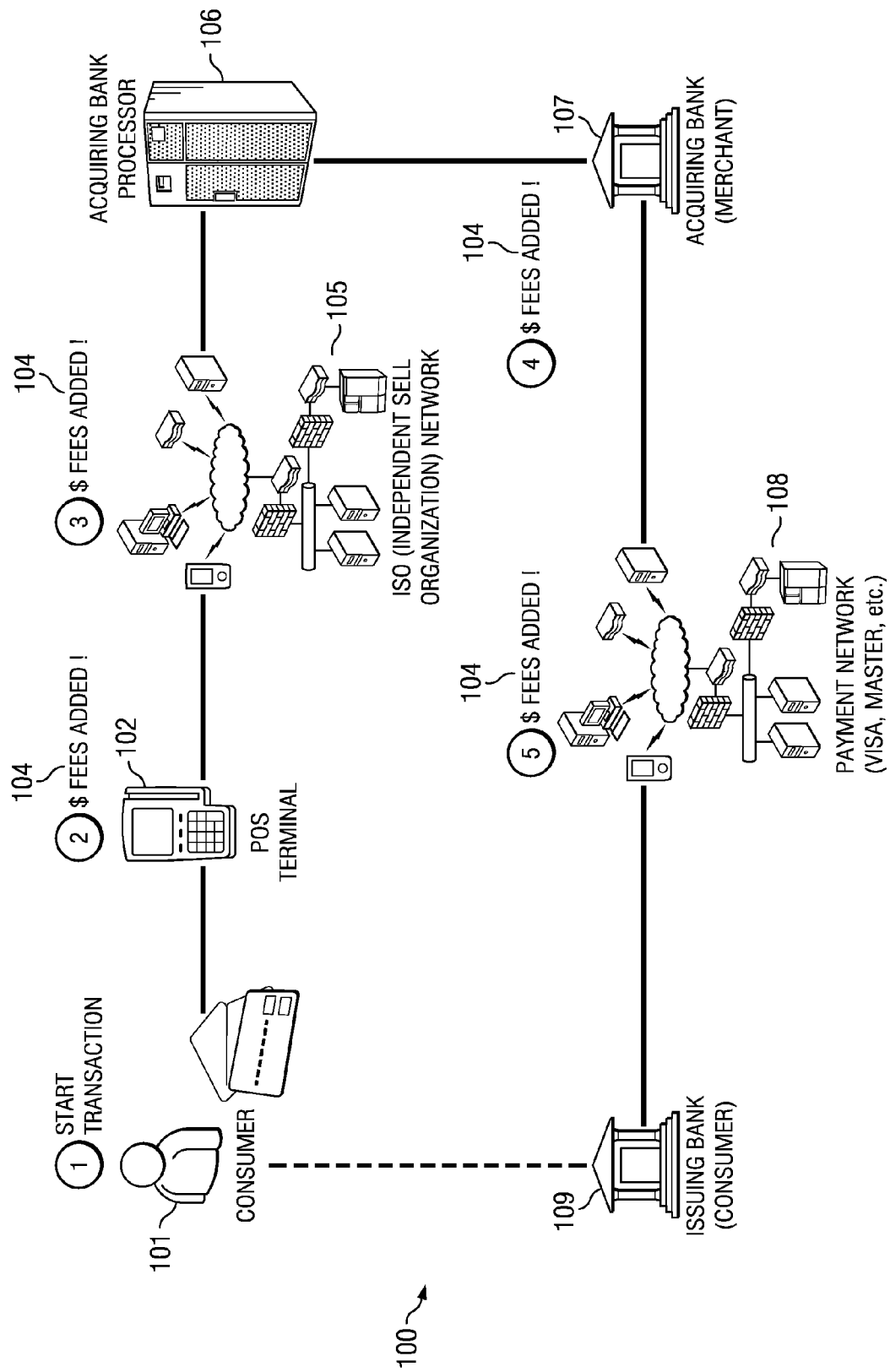
FIG. 1 is a schematic diagram illustrating a conventional transaction channel.

FIG. 1 is a schematic diagram illustrating a conventional payment channel 100. The consumer 101 starts the transaction with a merchant. The merchant uses a card reader 102. The consumer 101 uses a credit card or debit card 103 and pays for their goods or services via the merchant's card reader 102. Merchants generally access the transaction network through a third party such as an independent sales organization (ISO). The independent sales organization serves as an intermediary 105 between the merchant and the acquiring financial institution (i.e., the merchant's financial institution). At this step, the independent sales organization 105 may assess fees 104 as part of the transaction. Next, the transaction is processed through the core processor 106 of the acquiring financial institution 107 (the merchant's financial institution). Both the independent sales organization 105 and the acquiring financial institution 107 typically assess transaction fees 104. Next, the transaction is processed through a transaction network 108, e.g., Visa, MasterCard, etc. The transaction network 108 may also add transaction fees 104. Finally, the transaction is processed by the issuing financial institution 109 (the consumer's financial institution). Thus, transaction fees 104 may be added to process the transaction in multiple transaction points in the conventional transaction channel 100, and each supplier may add a cost to each transaction, regardless of the geographic location of the financial institutions involved. These transaction fees are generally assessed to the merchant.

Figure 2:
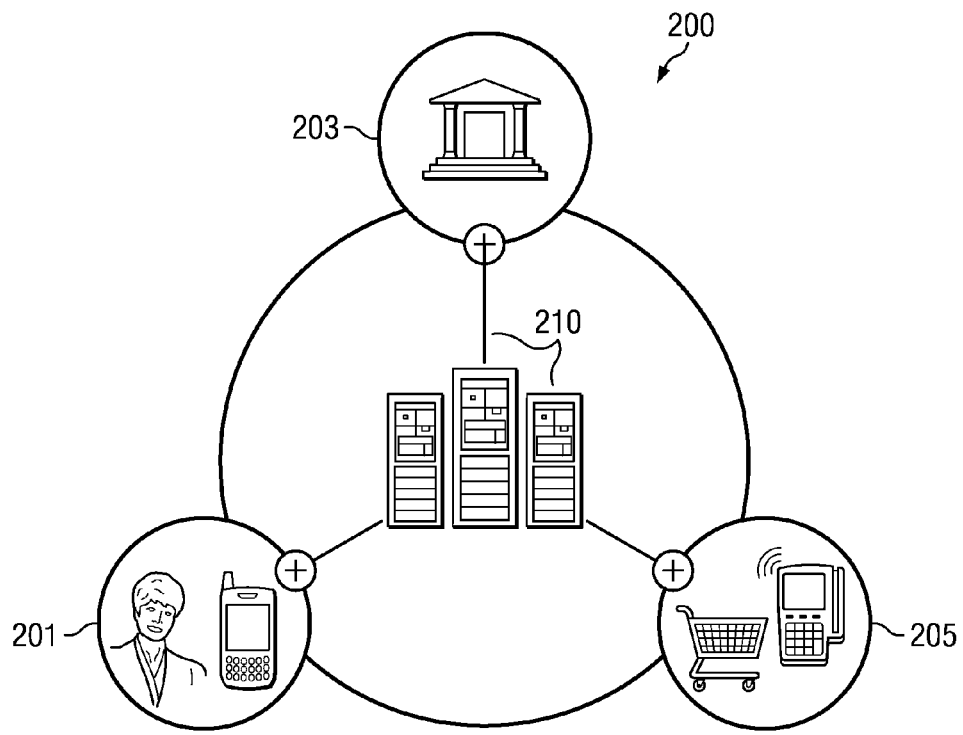
FIG. 2 is a schematic diagram illustrating an automatic transaction system, in accordance with the present disclosure.

FIG. 2 is a schematic diagram illustrating an automated transaction system 200 and three general components making up such a system: a consumer identifier mechanism 201, a merchant terminal 205, and a transaction platform 210 or network connecting consumers, merchants, and financial institutions 203 or other third parties. The automated transaction system 200 and, specifically, an exemplary transaction platform 210 suitable for use in the described embodiments of this application is discussed in more detail in U.S. patent application Ser. No. 11/969,711 to Casares et al., which is herein incorporated by reference for all purposes. The transaction platform 210 includes a computer processor and computer-readable memory that stores computer instructions that are operable to effect the functionality described herein.

The consumer identifier mechanism 201 may be a sticker equipped with a near-field communication (NFC) chip that allows consumers to initiate contactless transactions on the network 210. The merchant terminal 205 may be a wireless point-of-sale terminal equipped with a contactless reader that allows merchants to accept payments initiated by a consumer, and the terminal 205 may also be provided by the transaction network itself, a financial institution, or other third party. The merchant terminal 205 may also be a merchant acceptance method integrated with any type of merchant acceptance hardware or software, including any other point-of-sale terminal. Firmware and hardware operated on the merchant terminal 205 are implemented through computer instructions stored on a computer-readable medium on the merchant terminal in order to effect the functions described herein. The methodologies discussed herein are not limited to any one type of terminal and, in an embodiment, are "hardware agnostic" and may be employed with any financial transaction hardware or software. The transaction platform or network 210 connects the consumer and merchant to a financial institution or other funding source 203 to form a transaction network.

The consumer identifier mechanism 201 allows consumers to make convenient and secure transactions by tapping the mechanism or "tag" 201 on a merchant terminal 205 installed at a local merchant in the transaction platform or network 210. In an embodiment, the transaction is made simply by tapping or otherwise placing the mechanism 201 in near proximity to a merchant terminal 205 installed at a local merchant in the transaction platform or network 210. In an embodiment, using methods further described below, consumers receive instant confirmation on their phone after a successful transaction.

The automated transaction system 200 also offers a rewards module that allows financial institutions and merchants to offer rewards to consumers who perform mobile transactions on a consumer identifier mechanism 201. A consumer may accrue reward points for purchases made on the transaction platform 210. In an embodiment, using methods further described below, a consumer may redeem reward points at any network merchant.

The automated transaction system 200 may be designed to provide multiple levels of security and risk management to make the transaction network more secure than traditional credit and debit networks. In an embodiment, as further described in the present application, no personal or account information is stored on or inside the consumer identifier mechanism 201 or used at any stage of initiating and processing the transactions made on the transaction platform 210. The automated transaction system uses a set of encryption keys for the consumer identifier mechanism 201 and the merchant terminal 205 for transaction processing. In another embodiment, which is also further described below in the present application, the automated transaction system uses dynamic encryption keys (changing periodically based on a security algorithm) for both the consumer identifier mechanism 201 and the merchant terminal 205 to substantially decrease the risk of unauthorized replication or duplication of the devices.

As described herein, encrypted communication is used to transmit security/encryption keys between devices, and the keys are stored at the hardware level, making the keys difficult to retrieve by "skimming." As used herein, skimming refers to the theft of information, including account information, used in an otherwise legitimate transaction. In another embodiment, the automated transaction system employs a two-factor authentication process. For certain transactions, a consumer or merchant may be prompted to enter a unique PIN on their mobile device or on the merchant terminal 205 for authorizing the transaction. As further described herein, real-time short messaging (SMS messaging) confirmation on a consumer's mobile device is implemented to enable ongoing monitoring of account activity for a consumer.

Fraud Prevention and Dynamic Identification

The consumer identifier mechanism 201 may be designed to protect consumers against identity fraud and to prevent sticker cloning. Unlike traditional credit or debit cards, the consumer identifier mechanism 201 does not store any consumer personal or account information on the sticker. Instead, it uses a combination of two encryption keys during the transaction to identify the consumer for authorization purposes. These two keys are read by the merchant terminal 205 and are passed on to the transaction platform 210 for consumer authentication. If either of the keys is incorrect, the transaction is denied.

In the two-key authentication method described above, the first key is a unique identification number that is stored within a digital device on the consumer identifier mechanism 201, and this unique identifier serves as the primary identification for the sticker. The second key is a dynamic identification number, which is a dynamic number that changes after each transaction or after some number of transactions. When the consumer identifier mechanism 201 is read by the merchant terminal 205, the reader reads the old dynamic identification number and simultaneously replaces the old number with a new dynamic identification number that is generated by the merchant terminal 205 using a proprietary algorithm. The dynamic nature of the secure identification number may provide protection, such as preventing cloning of the mechanisms 201 for fraudulent purposes.

In an embodiment, each merchant terminal 205 has proprietary firmware that provides the transaction management and security functionalities. This proprietary firmware may comprise computer instructions stored on a computer-readable medium for operation of the transaction management and security functionalities. Like the consumer identifier mechanism 201, the merchant terminal 205 does not store any consumer personal or account information, nor does it have the ability to access or otherwise manipulate this information. Like the consumer identifier mechanism 201, the merchant terminal 205 may also use a dual-key design where a set of terminal-specific encryption keys is used during transactions to authenticate a consumer identifier mechanism 201. These keys may be stored at the hardware level for added security.

When the transaction platform 210 successfully receives a message from a merchant terminal 205, it generates a new key to be used by the terminal in the following message. This key is transmitted from the transaction platform 210 to the merchant terminal 205 with the synchronous response to the original message. This prevents or greatly hampers cloning of merchant terminals 205 in the network.

In an embodiment, each merchant terminal 205 may also periodically initiate a handshake process with the transaction platform 210 to set up a key that will be accepted for a given period of time. This key is obtained after a handshaking process that provides more security level than the message key process. The combination of both keys provides a secure channel between the merchant terminal 205 and transaction platform 210.

The transaction platform 210 infrastructure is designed as a three-tier solution where security zones (e.g., virtual area networks or VLANs) are created segregating web, application, and database networks. Accordingly, traffic is permitted to flow directly from the Internet to the different VLANs upon utilization of a two-factor virtual private network (VPN), e.g., both a security certificate and a username and password combination.

Firewalls are implemented according to the Payment Card Industry Data Security Standard (PCI DSS) specification to support the two-factor authentication. In an embodiment, by default, firewalls may deny inbound and outbound traffic that is not required for the application. Documented justification is required for any other available protocols, e.g., HTTP, SSL, SSH, and VPN. Any relatively risky protocol, such as FTP, may also require documented justification.

The transaction platform 210 may be run on servers at a certain location. In an embodiment, the servers are run using robust measures for security monitoring and reporting. In an embodiment, the transaction platform 210 utilizes a network security scanner (e.g., DataPipe, eEye's Retina network security scanner, etc.) to conduct fast, accurate, and non-intrusive scanning The servers are designed to be secure against the most recent of discovered vulnerabilities. A network-based intrusion detection system with real-time reporting may be used to monitor and detect malicious network activity that can compromise the security of the transaction platform 210. In-depth system integrity monitoring is performed to detect and report system changes so such changes can be tracked and validated. In an embodiment, the transaction platform 210 provides ICMP (Internet Control Message Protocol) and HTTP monitoring of servers (e.g., SureMonitor Enhanced Monitoring). The monitoring and reporting processes provide real-time reporting of file system changes including files, security settings, configuration parameters, and permissions, ensuring that changes have been planned and verified, and that unauthorized changes are investigated.

The security of the wireless channel between the merchant terminal 205 and the transaction platform 210 system is comprised of several aspects. Whenever a merchant terminal initiates activity with transaction platform 210, there is an agreement between both systems to share an encryption key, and the exchange of information is made through a layer of data encryption. Both the merchant terminal and the transaction platform 210 use Secure Internet Live Conference (SILC) Key Exchange (SKE) algorithms with symmetrical keys for data encryption/decryption.

Figure 3:
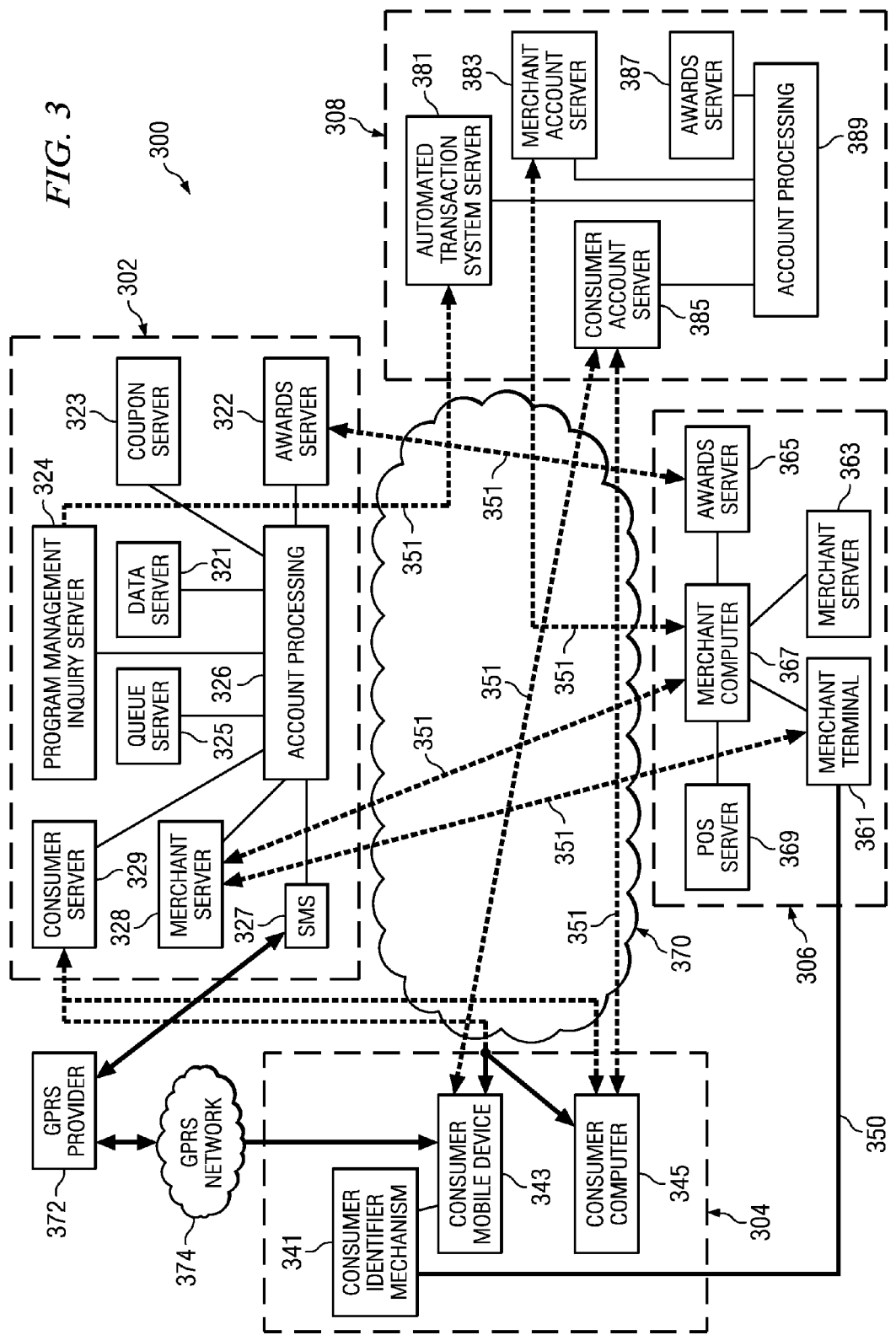
FIG. 3 is a detailed schematic diagram illustrating an automatic transaction system, in accordance with the present disclosure.

FIG. 3 is a detailed schematic diagram illustrating an automated transaction system 300. The automated transaction system 300 may be used for program managers 308 (including, but not limited to, depository institutions like banks and credit unions) desiring to facilitate transactions among their consumer and/or merchant customers. These transactions may include payment transactions, coupon redemption, reward or promotional transactions, mileage transactions, or any other type of transaction or exchange that may take place between a customer and a merchant. The automated transaction system 300 may include multiple components to initiate and complete transactions. A consumer identifier mechanism 341 is used for consumers to initiate transactions (including, e.g., cash back) at participating merchant locations. A merchant terminal 361 is a point-of-sale (POS) terminal used for merchants to accept transactions from participating consumers using a consumer identifier mechanism 341. An automated transaction platform 302 is a communications platform connecting consumer and merchant transactions to program managers' systems 308 for transaction processing and settlement. Communications between consumer systems 341, merchant systems 361, and program manager systems 308 may be facilitated through the automated transaction platform 302 via the Internet, a cloud computing network, or other public communication networks 370. Although a single consumer system 341, merchant system 361, and program manager system 308 are shown, there may actually be a plurality of consumer systems 341, merchant systems 361, and program manager systems 308 in communication with the automated transaction platform 302.

The consumer system 304 may include a consumer mobile device 343, a consumer computer 345, and/or a consumer identifier mechanism 341. In an embodiment, the consumer identifier mechanism 341 is attached to the consumer mobile device 343, but the consumer identifier mechanism 341 may be used separately from a consumer mobile device 343. The consumer identifier mechanism 341 is used to communicate 350 (e.g., via near-field communication) with a merchant terminal 361. Thus, the consumer identifier mechanism 341 may be attached to an item that the consumer typically carries (e.g., keys, wallet, mobile device, planner, etc.) or may be carried separately by the consumer. The consumer computer 345 may be a personal computer providing the consumer with access to a number of program manager websites (e.g., a personal banking site or an airline miles site). A consumer may also access various aspects related to their account at the automated transaction platform 302 via the consumer computer 345. For example, the automated transaction platform 302 may provide a consumer website over the Internet 370 providing content for the consumer's transactions, available rewards, coupons, memberships, etc. The consumer may also be able to access merchant websites via the Internet.

Connections 351 (indicated by a dotted line) are exemplary connections between the consumer system 341, merchant system 361, program manager system 308, and automated transaction platform 302, but other connections may be possible.

The merchant system 306 may include a merchant terminal 361, a point of sale (POS) server 369, a merchant computer system 367, an awards server 365, and a merchant server 363. The POS server 369 may be used for storing information and for processing space for POS transactions at the merchant terminal 361. The awards server 365 may be used for storing information for merchant reward, award, coupon, etc. information and to process related programs. In an embodiment, an awards server 322 is located at the automated transaction platform 302 and a merchant computer 367 may access this awards server 322 to determine merchant reward, award, coupon, etc. information and to process related programs. In another embodiment, both the merchant system 361 and the automated transaction platform 302 have awards servers 322, 365. The merchant server 363 may be used for storing other merchant-related information including marketing information, HR records, accounting, etc. and for executing or processing related programs.

The merchant computer 367 may also provide the merchant access to a number of websites (e.g., a business banking site). A merchant may also access various aspects related to merchant and customer accounts at the automated transaction platform 302 via the merchant computer 367. For example, the automated transaction platform 302 may provide a merchant website portal over the Internet 370 providing content for the merchant's transactions, available rewards, coupons, memberships, etc. The merchant may also be able to access consumer data including, but not limited to, data warehouse analytics, at the automated transaction platform's data server 321.

The separate modules for the POS server 369, merchant computer system 367, awards server 365, and merchant server 363 are for illustration purposes only. The servers and computer system may all be encompassed within one machine or may be a group of networked machines. The merchant terminal 361 may be networked with the merchant computer system and servers.

When a transaction is initiated by a consumer via their consumer identifier mechanism 341 at a merchant terminal 361, the merchant system 306 may transmit information to and access information from the automated transaction platform 302. For example, when a consumer uses their consumer identifier mechanism 341 for coupon redemption, the merchant system 361 may access the automated transaction platform's 302 coupon server 323 to determine whether the coupon is valid and how much the coupon is worth. Alternatively, the merchant may have coupon validity and value information stored at the merchant server 363 and may access the automated transaction platform's 302 coupon server 323 to link the consumer identifier mechanism 341 with the coupon and with the consumer's account. The automated transaction platform 302 may facilitate an automatic transaction using the coupon information, consumer information, merchant information and, optionally, associated financial institution or program manager information. Similar levels of involvement are true for other types of transactions including rewards-based transactions and payment transactions. The automated transaction platform 302 may be flexible depending on each consumer, merchant, and program manager to provide as little or as much transaction information and processing as is used by a particular transaction.

The program manager system 308 may include an automated transaction system server 381, a merchant account server 383, a consumer account server 385, an awards server 387, and an account processor 389. The program manager system 308 may be a financial institution system with servers 385, 383 for consumers and merchants. The account processor 389 may process transactions and update information related to consumers, merchants, and awards at the servers 385, 383, 387. The automated transaction system server may store information related to the automated transaction platform 302 and the automated transaction platform 302 may access and update the automated transaction system server 381 during a transaction.

The separate modules for the automated transaction system server 381, the merchant account server 383, the consumer account server 385, the awards server 387, and the account processor 389 are for illustration purposes only. The servers and computer system may all be encompassed within one machine or may be a group of networked machines.

The automated transaction platform 302 may include a consumer server 329, merchant server 328, SMS module 327, program management inquiry server 324, queue server 325, coupon server 323, awards server 322, data server 321, and account processor 326. The automated transaction platform 302 facilitates transactions and transaction-related communication between the consumer system 341, merchant system 361, and the program management system 389. The consumer server 329 may store data related to a number of consumer accounts and execute consumer-related programming. The merchant server 328 may store data related to a number of merchant accounts and execute merchant-related programming. The SMS module 327 may communicate with a GPRS provider 372 to provide alerts to a consumer mobile device 342 via the GPRS network 374. The program management inquiry server 324 may store data related to program management inquiries and execute program management inquiry-related programming. The queue server 325 may store data related to queue management and execute related programming. The coupon server 323 may store data related to coupons and execute related programming. The awards server 322 may store data related to awards and rewards and execute related programming. The data server 321 may store aggregated data related to consumer and merchant transactions as well as execute data warehouse analytics programming. Other servers may be possible including any servers related to consumer-merchant transactions or exchanges.

The separate modules for the consumer server 329, merchant server 328, SMS module 327, program management inquiry server 324, queue server 325, coupon server 323, awards server 322, data server 321, and account processor 326 are for illustration purposes only. The servers and computer system may all be encompassed within one machine or may be a group of networked machines.

In an embodiment, the program manager system 308 is a depository institution. The depository institution may provide a consumer identifier mechanism 341 to a depository institution customer so that the consumer customer can initiate payments. In this case, the depository institution will be referred to as an "Issuing Bank" herein. In another embodiment, a depository institution provides merchant terminals 361 to a depository institution merchant customer so that the merchant customer may accept payments. In this case, the depository institution will be referred to as an "Accepting Bank" herein. A participating depository institution may act as an Issuing Bank, an Accepting Bank, or both in any transaction in the automated transaction system 300.

As discussed in U.S. Prov. Pat. App. No. 61/305,925, in an embodiment, the consumer identifier mechanism 341 may be a sticker attached to a mobile device. A consumer may initiate contactless transactions with a merchant at the point of sale by tapping the consumer identifier mechanism 341 on a merchant terminal 361. The consumer identifier mechanism 341 initiates a payment through the transaction platform 302.

The automated transaction platform 302 is operable to conduct a transaction in the automated transaction system 300. The automated transaction platform 302 directs settlement and reconciliation processes over the automated transaction system 300.

In an embodiment, after the consumer identifier mechanism 341 is tapped on the merchant terminal 361, the transaction platform 302 issues instructions to the Issuing Bank and Accepting Bank that result in the consumer identifier mechanism 341 user account at the Issuing Bank being debited and the merchant's designated account at the Accepting Bank being credited. As described in more detail below, as part of the settlement process, multiple amounts are distributed: (1) an issuing fee is distributed to the Issuing Bank; (2) an accepting fee is distributed to the Accepting Bank; (3) a processing fee is distributed to automated transaction system account; and (4) the balance of the funding is distributed to the merchant.

In an embodiment, the Issuing Bank is responsible for settling funds to the Accepting Bank arising from the transactions conducted by the Issuing Bank's consumer identifier mechanism users with their mechanisms 341. The Issuing Bank will rely upon settlement information provided by the transaction platform to effect this settlement.

For all of the specific machines or components illustrated in FIG. 3, there are multiple computers and/or servers that will implement the functionality to be performed by those machines. These computers and/or servers will operate according to instructions that have been stored to instruct the operations of processors on those computers and/or servers, and those instructions will be stored on computer-readable mediums. For the sake of simplicity and readability of these figures, the computer-readable memory is not illustrated in all cases, but one of ordinary skill in the art will know how to provide such memory and instructions to effect the functions described herein.

Figure 4:
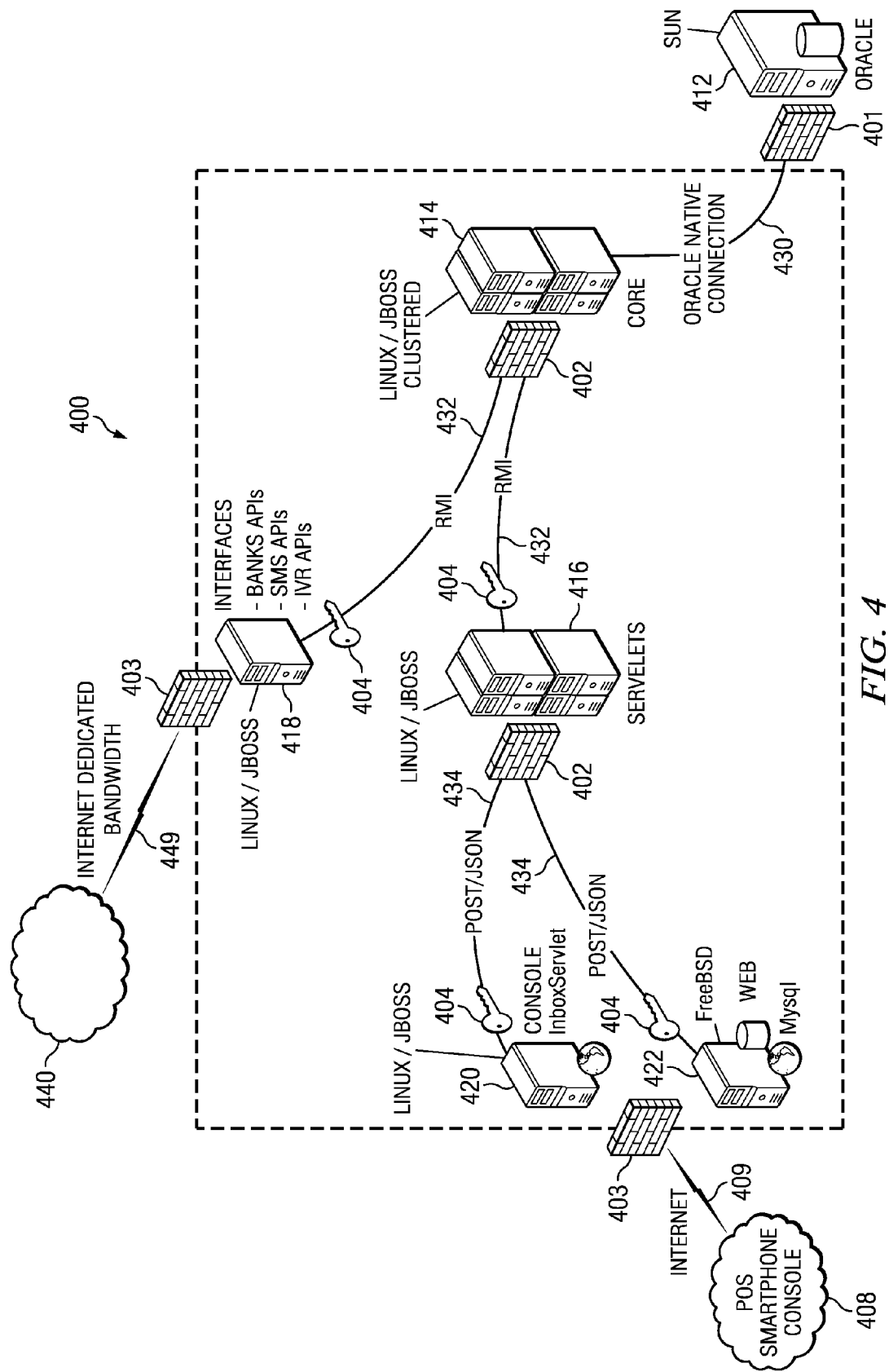
FIG. 4 is a schematic diagram illustrating an automated transaction system network, in accordance with the present disclosure.

FIG. 4 is a schematic diagram illustrating an embodiment of an automated transaction platform 400. The automated transaction platform 400 may include a computer cluster 414, servlets 416, interfaces 418, consoles 420, and web machines 422. The interfaces 418 may include, but are not limited to, financial institution application programming interfaces (APIs), short messaging services (SMS) APIs, and interactive voice response (IVR) APIs. The computer cluster 414 work together closely and, in many respects, form a single computer to process transactions and payments on the automated transaction platform 400. In an embodiment, the web machines 422 include a web-based management console and software envisioned for financial institutions to configure, monitor, and control the transaction platform or network. In an embodiment, the computer cluster 414 is implemented using a Linux JBoss cluster. In an embodiment, the servlets 416 are also implemented using a Linux JBoss cluster. Servlets, APIs, clusters, and management consoles and software are implemented according to computer instructions stored on a computer-readable medium in accordance with known software and computer hardware design principles.

The automated transaction platform 400 is connected to other components 408 of the automated transaction system, e.g., a consumer identifier mechanism or merchant terminal, via a connection 409. In an embodiment, the connection 409 is a wireless connection. The connection between the other components 408 and the automated transaction platform 400 is protected by an Internet firewall 403. The automated transaction platform 400 is also connected to the Internet 440 via a connection 449 protected by an Internet firewall 403. In an embodiment, the connection 449 is a wireless connection.

The computer cluster 414 is in communication with a server 412. The connection 430 between the computer cluster 414 and the server 412 is protected by a database firewall 401. In an embodiment, the server 412 is an Oracle server and the connection 430 is an Oracle native connection. The computer cluster 414 is also in communication with the interfaces 418 and the servlets 416. The connections 432 between the computer cluster 414, the interfaces 418, and the servlets 416 are protected by a middleware firewall 402. In an embodiment, the connections 432 are remote method invocation (RMI) connections. The servlets 416 are connected with the consoles 420 and the web machines 422 via connections 434. The connections 434 are protected by middleware firewalls 402. In an embodiment, the connections 434 may comprise POST/JSON connections. In an embodiment, the connections 434 and 432 are also protected by an authentication system 404. The computer server machines, firewalls, and other components of the system illustrated in FIG. 4 are implemented according to computer instructions stored on computer-readable mediums in communication with their associated machines. These implementations are consistent with the other implementations of such computer machines in the present application, and therefore it should be understood that computer-implemented instructions stored on computer-readable media will be effected for multiple computer system elements throughout this specification.

Referring back to FIG. 2, communication between a merchant terminal 205 and the transaction platform 210 may be made through a single entry point. That allows the transaction platform to securely communicate with the external world while protecting the sensitive services behind the firewalls. As a result of the handshaking process, the transaction platform 201 provides new encryption keys to the merchant terminal 205 and grants access to the core services through the single entry point. In an embodiment, the encryption keys have a 24-hour expiration policy.

In an embodiment, messages are transmitted through a general packet radio service (GPRS) system or any other mobile phone system. Messages sent through the GPRS network are encrypted using these encryption keys discussed above. Messages arrive to the single entry point (the only service made public by the transaction platform) and once there, the transaction platform 210 validates the security credentials provided by the message.

Figure 5:
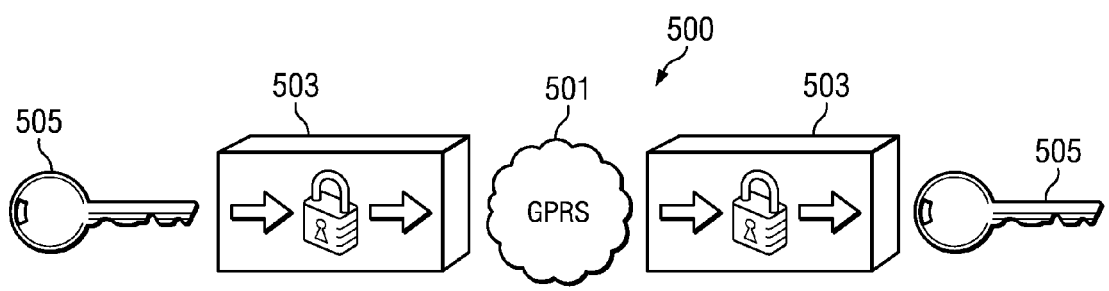
FIG. 5 is a schematic diagram illustrating encrypted data transmitted over a wireless network, in accordance with the present disclosure.

FIG. 5 is a schematic diagram illustrating data encryption process 500 over a GPRS network 501. The data 503 is encrypted using encryption keys 505. The encrypted data 503 is transmitted through the GPRS network 501.

Figure 6:
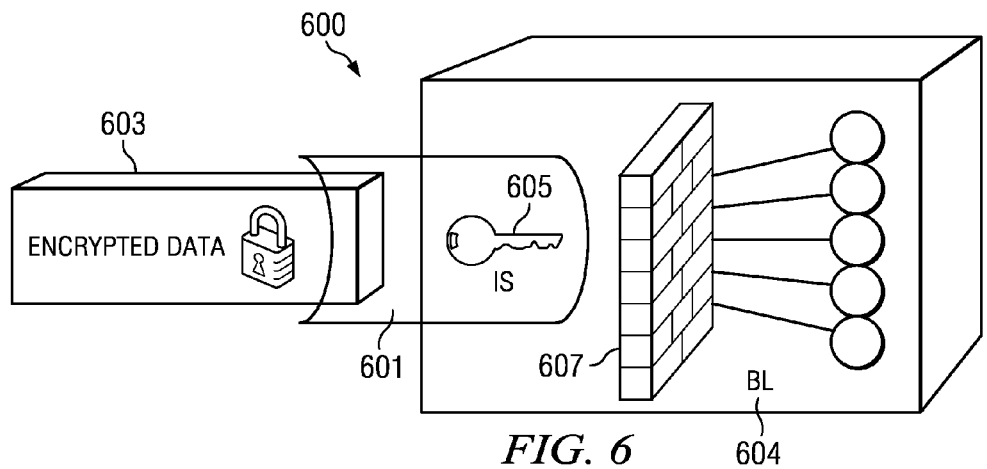
FIG. 6 is a schematic diagram illustrating encrypted data arriving at a point of entry into the automated transaction system network, in accordance with the present disclosure.

FIG. 6 is a schematic diagram 600 illustrating the single point of entry 601 to the automated transaction platform 604. The encrypted data 603 arrives at the single point of entry 601 (or at the Internet level firewall 607) and the encryption keys 605 are used so that the automated transaction platform 604 will grant access to core services. If the encryption keys 605 are validated, then access is granted and the transaction may continue. If the credentials are not validated, the transaction platform 604 will deny access to the core services and force the merchant terminal to go through a handshaking process again for keys regeneration. If the credentials are validated, the transaction platform allows access to a second security level.

Figure 7:
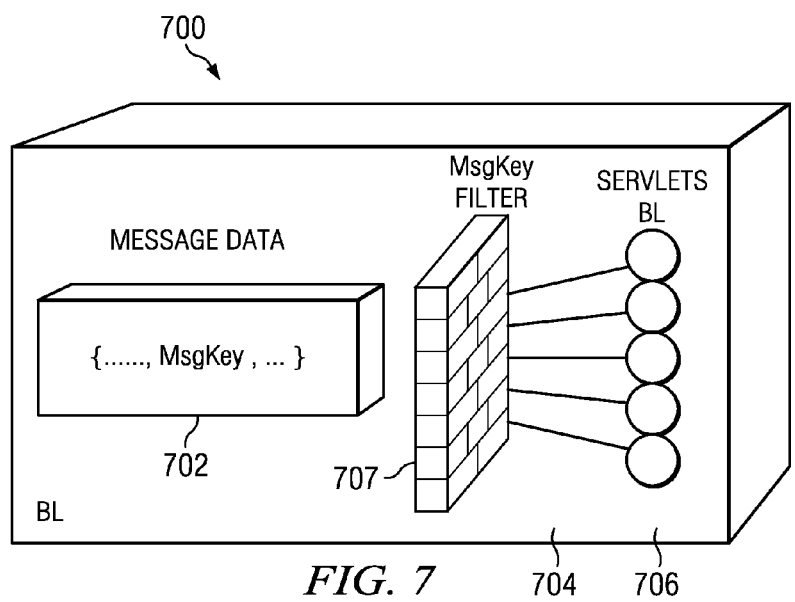
FIG. 7 is a schematic diagram illustrating message data arriving at a second level security point in the automated transaction system network, in accordance with the present disclosure.

FIG. 7 is a schematic diagram 700 illustrating a second security level 700. Once the message arrives at the second security level 700 (or at the middleware level firewall 707), the data has been decrypted. Message data 702 passes through the middleware level firewall 707 to the core services of the automated transaction platform 706. The transaction platform 706 will check the sequence of the messages received by that device.

Referring back to FIG. 4, with each response to a particular device 408, the transaction platform 400 generates a one-time key called message key that is included with the response message. When the transaction platform 400 receives a message from such a device, it also checks that the key received is the same one as the one provided to that particular device 408 with the last response. If not, the transaction platform 400 will reset the channel with that particular device 408 and request a new handshaking Referring back to FIG. 2, the transaction platform 210 may provide financial institutions 203 with a web-based management console to configure, monitor and control the transaction network. An SSL certificate exclusive to each financial institution 203 is issued by the transaction platform 210, and a financial institution designated administrator is provided with console privileges unique for that financial institution 203. To access the transaction platform 210 from one or more of a financial institution's 203 computers, the financial institution 203 installs the SSL certificate into the web-browser on those computers. The transaction platform 210 management console may reject connection requests from computers where a valid SSL certificate issued by the transaction platform 210 is not installed. The financial institution designated administrator may ensure the safekeeping of the SSL certificate.

Communications between the financial institution's 203 management console and the transaction platform 210 may be encrypted using 128-bit SSL algorithms (e.g., https). Each financial institution 203 also has the option to require that a VPN connection be established before allowing a financial institution 203 computer to access the transaction platform 210. Once a financial institution's 203 computer is authenticated, the administrator may create new console users and grant them different access levels based on customized profiles created in the console.

The transaction platform 210 may also provide a management console for use by participating merchants 205. A merchant-designated administrator is provided with console privileges unique to that merchant 205. Communications between the merchant's management console and the transaction platform 210 may be encrypted using 128-bit SSL algorithms (e.g., https).

Settlement Process

As discussed above, transactions processed using the automated transaction system are initiated by consumers, and accepted by merchants, through the transaction platform. Unlike prior art settlement processes, which used batch processing to process and balance large groups (sometimes a day's worth) of transactions, the present system enables real-time or near-real-time settlement of each transaction.

Referring back to FIG. 2, using the approach set forth in the present application, for a given transaction, upon presentment of a consumer identifier mechanism 201, the financial institution associated with that mechanism can be assessed a fee, the merchant bank associated with the merchant to which the mechanism 201 can be credited with funds, and the intermediate or automatic transaction processing service can be credited with a transaction processing fee. The efficient, real-time automatic system for receiving and processing of these consumer-identified transactions is enabled by the system architecture defined in embodiments of the present application.

Transactions may be routed "on-us" (generally speaking, "on-us" refers to intra-institution routing for financial instruments where consumers and merchants bank with the same financial institution). The transaction platform may enable community-based financial institutions to participate fully in the economic benefits of payment processing. The automated transaction network empowers consumers with innovative mobile technology to enable fast, convenient and secure payments with merchants in the community. At the same time, local merchants benefit from simplified, low-cost acceptance and expedited funding.

Thus, as described herein, consumers can initiate contactless debit transactions at local merchants by tapping their consumer identifier mechanism 201 on a merchant terminal 205. Once a transaction is authorized, a consumer's account is substantially immediately debited for the amount of the transaction, and the merchant immediately receives funds as part of the settlement process. During the settlement process, for example, four amounts may be transferred: (1) an issuing fee is transferred to the issuing financial institution, which is the financial institution that issues consumer identifier mechanisms 201 to consumers; (2) an accepting fee is transferred to the accepting financial institution, which is the financial institution that enables acceptance of payments by merchants using a merchant terminal 205 (in an "on-us" transaction, the accepting financial institution is the same as the issuing financial institution); (3) a processing fee is transferred to the automated transaction service; and (4) the balance of the funding is transferred to the merchant. All of these activities can occur substantially in real-time through the automated systems defined herein.

The settlement of "on-us" transactions, or intra-financial institution transactions, is initiated by the automated transaction service and, in an embodiment, may be completed in real-time through the transaction platform 210 transaction processing service, although most financial institutions may only wish to settle once per day. Same-day processing provides advantages including, but not limited to, efficient distributing issuing and accepting fees to financial institutions; efficient distributing of the processing fee to the automated transaction service; same day funding of the merchant account; and efficient clearing and reconciling of the operating account.

The automated transaction system approach to settling transactions may expedite merchant funding, expedite delivery of issuing fees, and eliminate the high monthly services invoice typically associated with network transaction processing. Services provided by the automated transaction service, including authorization, authentication, settlement, and console-based client management and reporting are included in the automated transaction service transaction fee that is collected from the financial institution during the settlement process. The automated transaction service also supports rewards programs. Rewards programs may be offered by consumer identifier mechanism 201 issuers and participating merchants to encourage spending and loyalty.

The participants in an "on-us" transaction include a consumer and a merchant that both maintain demand deposit checking accounts with the same financial institution. The architecture of the automated transaction system service promotes and rewards "on-us" transactions as they enable community financial institutions to participate in the economic benefits of both issuing consumer identifier mechanisms 201 to consumers and enabling acceptance of payments by merchants with merchant terminals 205. Typically, only the largest institutions are able to conduct "on-us" processing—and the economic benefits are limited or unavailable to smaller or community financial institutions. In an embodiment, the consumer initiates "on-us" transactions with the consumer identifier mechanism 201 on their mobile device at the merchant's merchant terminals 205. The automated transaction system service may complete transaction settlement the same day.

Participants in an "open loop" transaction include a consumer maintaining an account with one financial institution and the merchant maintaining an account with another financial institution.

The automated transaction system service enables participating financial institutions to develop and implement customized transaction level risk management policies. A configuration setting may be recommended, but participating financial institutions may configure transaction level risk management policies. In an embodiment, risk configurations are based on consumer transaction behavior, specifically the amount and frequency of transactions.

Figure 8:
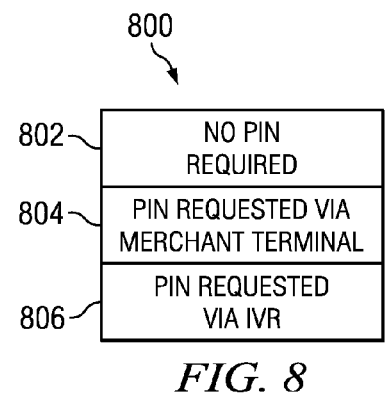
FIG. 8 is a schematic diagram illustrating exemplary authentication standards, in accordance with the present disclosure.

FIG. 8 is a schematic diagram illustrating exemplary authentication standards 800. Financial institutions have the opportunity to customize authentication standards 800 based on characteristics such as transaction size or merchant type. The optional and customizable security levels currently include, but are not limited to no-PIN-required 802, PIN-requested-via-merchant-terminal 804, and PIN-requested-via-IVR 806.

The no-PIN-required authentication standard 802 may be used for transactions defined by a financial institution to be low in risk. These transactions may be authorized without the entry of a PIN number. In an embodiment, the transaction size and merchant business categories are defined by participating financial institutions.

The PIN-requested-via-the-merchant-terminal authentication standard 804 may also be configured by the financial institution. In this embodiment, a financial institution configures the transaction platform to ask consumers to enter a PIN number into the merchant terminals based on the transaction characteristics. A message on the merchant terminal will inform the merchant to ask the consumer to enter the PIN. In another embodiment, the consumer or merchant determines which transaction sizes and merchant business categories for which a PIN number is requested.

The PIN-requested-via-IVR authentication standard 806 may be used, either by request of the financial institution or of the end users (merchant or consumer). In an embodiment, the PIN-requested-via-IVR authentication standard 806 may be used for transactions having the highest risk. For transactions determined by the financial institution to have the highest risk, the transaction platform may be configured to initiate an automated outbound IVR phone call to the consumer's mobile phone. An automated transaction system service phone service may then prompt the consumer to enter the consumer's PIN into the mobile phone.

Once the appropriate PIN authentication has been completed, the transaction will be approved or declined. In an embodiment, PINs are created at the time the consumer identifier mechanisms are issued to consumers.

Referring back to FIG. 4, in the event a consumer or merchant requests (or is required) to provide a refund, if the transaction has not settled (meaning the consumer's account has not been debited and the merchant's account has not been credited), a reversal can be initiated from the merchant terminal 408. A reversal request is input into the merchant terminal 408 by the merchant and results in the deletion of the initial transaction. No fees are charged to the merchant or participating financial institutions for a reversal transaction.

In the event a consumer or merchant requests (or should provide) a refund, if the transaction has settled (meaning the consumer's account has been debited and the merchant has been credited and the payment is complete for the initial transaction), a merchant may initiate a refund transaction to the consumer as described below.

Once an automated transaction system transaction has been settled and a consumer requests a full or partial refund, a refund transaction is used to return funds from the merchant to the consumer. Merchants may initiate refund transactions at the merchant terminal 408 or via a web-based merchant management console 422. When a refund takes place, the merchant account will be debited for the refund amount and the consumer account will be credited for the refund amount. A refund may be requested for the full purchase amount or a partial refund amount.

At any time, a consumer may choose to dispute a transaction. In order to initiate a disputed transaction for any reason, a consumer will be instructed to contact his or her financial institution. Financial institution-designated customer service representatives (CSRs) may log disputed transactions in a transaction platform web-based management console 422 by selecting a given transaction and changing the transaction status to "Disputed-Open."

In an embodiment, if a disputed transaction has not been settled, it will be flagged within the transaction platform 400 and will not be settled. If a disputed transaction has been settled, the full purchase amount will be debited from the merchant account until the dispute has been resolved.

In an embodiment, at the time a disputed transaction is registered, a customer service representative may also determine the appropriate reason code for the chargeback.

Figure 9:
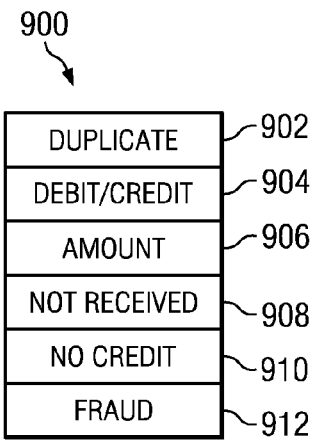
FIG. 9 is a schematic diagram illustrating sample communication channels, including reason codes for disputed transactions, in accordance with the present disclosure.

FIG. 9 is a table 900 illustrating sample reason codes for disputed transactions. Sample reason codes include, but are not limited to, duplicate 902, debit/credit 904, amount 906, not received 908, no credit 910, and fraud 912.

The "duplicate" reason code 902 may be used when an issuer receives notice from a consumer acknowledging participation in one transaction and disputing participating in a transaction of equal dollar amount at the same time.

The "debit/credit" reason code 904 may be used when an issuer receives notice from a consumer that a debit was received for a credit transaction or a credit was received for a debit transaction.

The "amount" reason code 906 may be used when an issuer receives notice from a consumer that the purchase price on the sales receipt did not equal the amount of the debit to the consumer's account.

The "not received" reason code 908 may be used when an issuer receives notice from a consumer that the goods or services paid for at the merchant terminal were not received, defective, or not as described.

The "no credit" reason code 910 may be used when an issuer receives notice from a consumer that a credit for returned goods was not processed.

The "fraud" reason code 912 may be used when an issuer receives notice from a consumer that a transaction was fraudulent.

In an embodiment, if the transaction has not been settled, the transaction will be flagged in the transaction platform as "Disputed" and the transaction will be excluded from the settlement process. If the transaction has been settled, the merchant account will be immediately debited for the full refund amount. In an embodiment, the consumer's issuing financial institution is responsible for resolving the dispute with the merchant (and the merchant's financial institution, if necessary).

In the event the dispute is resolved in favor of the consumer, the consumer will be credited the chargeback amount. If the chargeback is resolved in favor of the merchant, the transaction platform will credit the merchant account and log the transaction as resolved. If the chargeback is resolved in favor of the merchant and the transaction was not previously settled, the transaction will be included in the next settlement event.

In general, the communication medium between a financial institution and a merchant terminal is highly functional and highly flexible. Many types of communications and messages may be facilitated by the communication channel of the described embodiments including, but not limited to, options in rewards programs, offers, etc.

Processing "on-us" transactions through the transaction platform uses four or more system-designated accounts at each participating financial institution: (1) a transfer settlement account; (2) an automated transaction system account; (3) a bank fees account; and (4) a bank rewards account. These accounts enable the transaction platform to debit and credit the appropriate participants during authorization and settlement.

Figure 10:
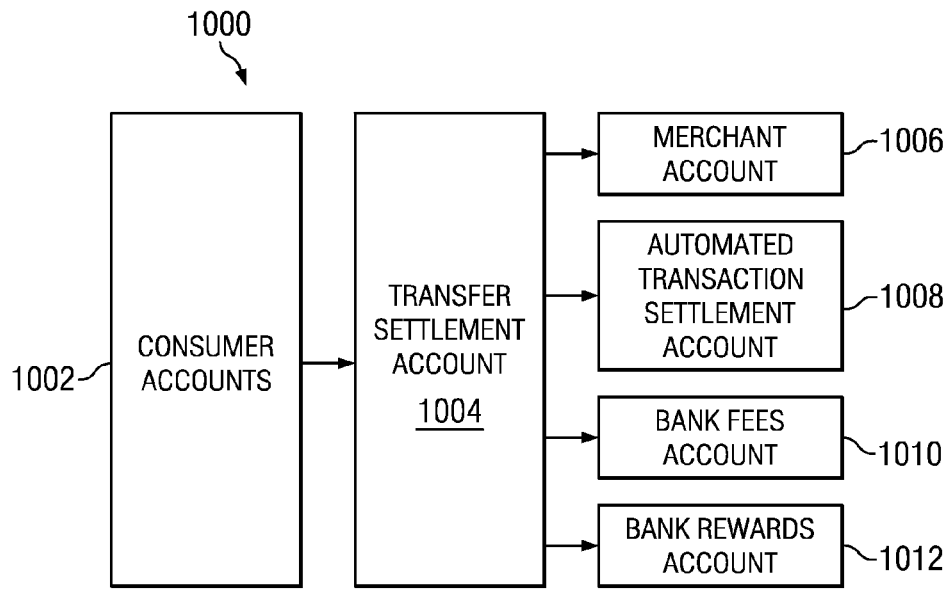
FIG. 10 is a schematic diagram illustrating account flow, in accordance with the present disclosure.

FIG. 10 is a schematic diagram 1000 illustrating system-designated account flow. The transfer settlement account 1004 is used to hold consumer funds between the time of the authorization and settlement. The transfer settlement account 1004 is a financial institution-owned account. As consumers transact throughout the day, the credit balance of the transfer settlement account 1004 builds with funds debited from consumer accounts 1002. During the settlement process, the transfer settlement account 1004 is cleared and the merchant account 1006, a financial institution account, and the automated transaction system account receive funding or fees. The automated transaction system account 1008 is used to hold the processing fees owed to the automated transaction system following settlement. The bank fees account 1010 and bank rewards account 1012 are used to holds the issuing and accepting fees owed to the financial institution following settlement.

Figures 25, 26:
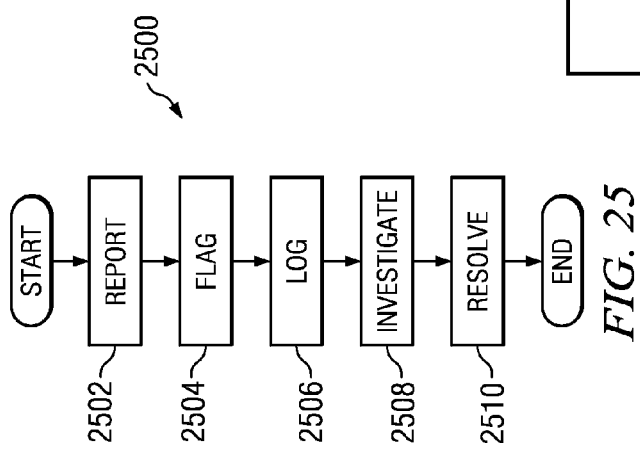
FIG. 25 is a flow diagram illustrating dispute resolution for the automated transaction system, in accordance with the present disclosure.
FIG. 26 illustrates an exemplary flow of funds, in accordance with the present disclosure.

FIG. 26 is a table 2600 illustrating an exemplary flow of funds for an "on-us" transaction. Referring both to FIG. 10 and FIG. 26, by way of example only, a transaction of $50.00 is authorized by the consumer. The consumer account 1002 is debited by $50.00 and the transfer settlement account 1004 is credited $50.00. During settlement, the transfer settlement account 1004 issues $0.xx and $0.yy to the bank fees account 1010, issues $0.zz to the automated transaction system account 1008, and issues ($50.00-$0.xx-$0.yy-$0.zz) to the merchant account 1006.

In an embodiment, the settlement cut-off time for merchants to receive same-day funding for "on-us" transactions is 10:00 PM Eastern Time. The merchant account 1006, bank fees account 1010, and automated transaction system account 1008 are immediately funded. The transfer settlement account 1004 should report a zero balance. In an embodiment, in the event that a financial institution prefers to select an alternative cut-off time or multiple intra-day cut-off times, the transaction platform is able to conduct settlement throughout the day.

The balance of the transfer settlement account 1004 at the end of each day, which includes merchant funding, financial institution fees, and the automated transaction system service fees, should be entirely distributed following settlement. Excluding transactions authorized after the 10:00 PM ET cut-off and unresolved disputed transactions, the balance of the transfer settlement account 1004 will reconcile to zero at the end of the day. The bank fees account 1010 will contain only issuing and accepting fees owed to a financial institution.

Figure 11:
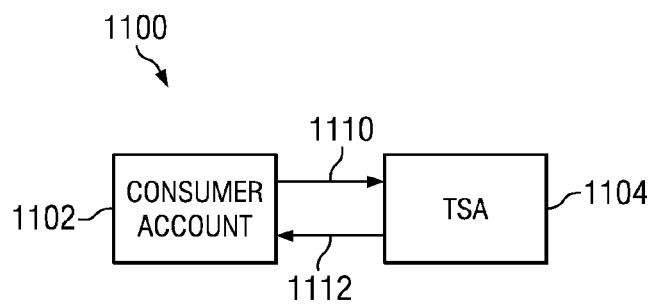
FIG. 11 is schematic diagram illustrating an embodiment of a settlement process, in accordance with the present disclosure.
Figure 12:
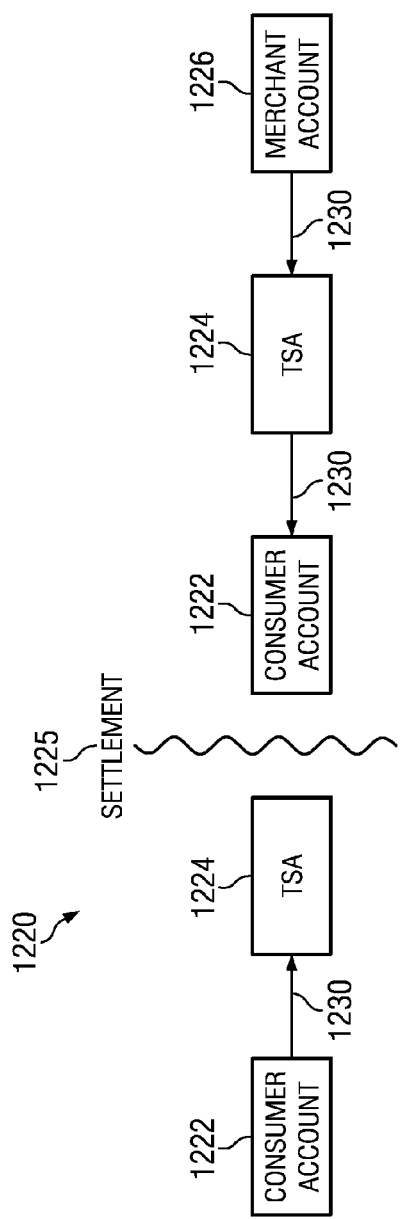
FIG. 12 is schematic diagram illustrating another embodiment of a settlement process, in accordance with the present disclosure.
Figure 13:
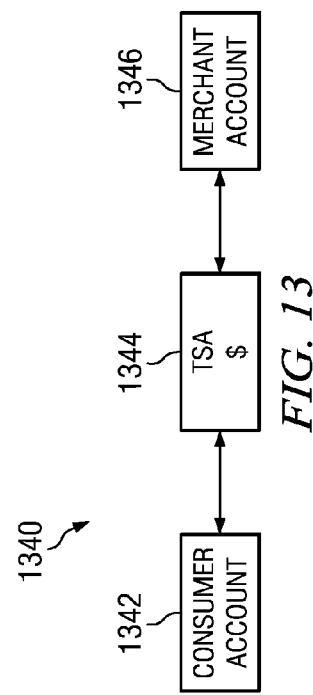
FIG. 13 is schematic diagram illustrating another embodiment of a settlement process, in accordance with the present disclosure.

FIGS. 11, 12, and 13 are schematic diagrams illustrating various settlement processes 1100, 1220, and 1340.

FIG. 11 illustrates a reversal or cancelled transaction 1100. A reversal or cancelled transaction 1100 is a transaction in which a consumer refund is requested prior to settlement, i.e. a transaction that does not require settlement and/or reconciliation. Assume a consumer account 1102 is debited by a purchase amount 1110 and the transfer settlement account 1104 is credited by the same amount during a transaction. In the case of a reversal or cancelled transaction 1100, the transfer settlement account 1104 is substantially immediately debited the full purchase amount 1112 and the consumer account 1102 is credited the full amount. No fees are charged in the event of a reversal or cancelled transaction 1100.

FIG. 12 illustrates a refund transaction 1220. A refund transaction 1220, following the settlement 1225 of a transaction, is a transaction in which a merchant initiates a refund transaction from a merchant terminal or a merchant management console (shown in FIG. 4 as 408 and 422, respectively). A refund transaction is processed separately from the initial transaction, which has already been processed including the assessment of issuing fees, accepting fees, and the automated transaction system service fees to the merchant. Assume a consumer account 1222 is debited a purchase amount 1230 and the transfer settlement account 1224 is credited by the same amount during a transaction and that the transaction is settled. The full or partial purchase amount 1230 is then debited from the merchant account 1226 and credited to the consumer account 1222.

FIG. 13 illustrates a chargeback or disputed transaction 1340. A chargeback or disputed transaction 1340, once identified and logged by a financial institution-designated customer service representative, is reviewed to determine the current transaction status. Transaction dollars not yet settled will remain in the transfer settlement account 1344 account pending dispute resolution. In the event the dispute is resolved by the financial institution in favor of the consumer, the transaction platform will initiate a reversal transition and the funds will return to the consumer account 1342. If the dispute is ruled by the financial institution in favor of the merchant, the transaction platform will settle the transaction as an "on-us" transaction and the funds will continue to the merchant account 1346 (and the fees will be issued to the automated transaction service account and the financial institution fees account, shown in FIG. 10).

If a disputed transaction has been previously settled, the merchant account 1346 will be substantially immediately debited for the full purchase amount and placed in the transfer settlement account 1344 pending resolution. If the dispute is ruled in favor of the consumer, the transaction platform will initiate a transfer of the full purchase amount from the transfer settlement account 1344 to the consumer's account 1342. If the dispute is ruled in favor of the merchant, the transaction platform will credit the merchant account 1346 for the full purchase amount and debit the transfer settlement account 1344.

The processes illustrated in FIGS. 11-13 can be easily modified for "open loop" transactions. By way of example only, an open loop transaction flow is from the consumer account to the transfer settlement account of the consumer's financial institution, then from the transfer settlement account of the consumer's financial institution to an automated transaction system account of the financial institution for the consumer, then to an automated transaction system account of the financial institution for the merchant, and then to the transfer settlement account of the financial institution for the merchant, and finally to the merchant account.

Figure 14:
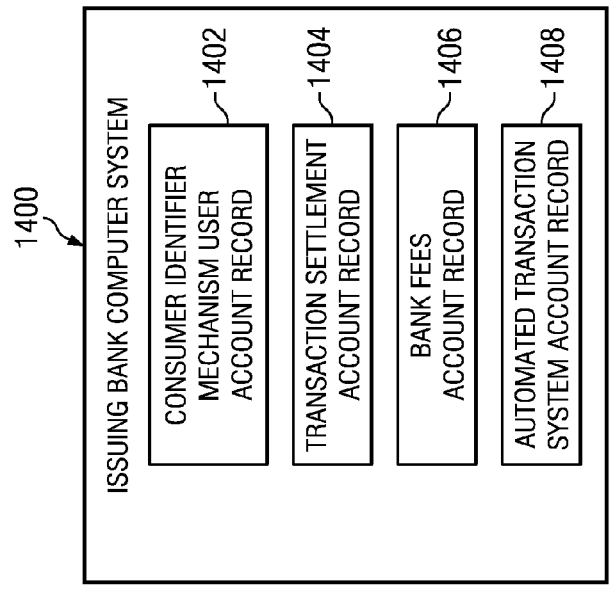
FIG. 14 is a schematic diagram illustrating an Issuing Bank computer system, in accordance with the present disclosure.
Figure 15:
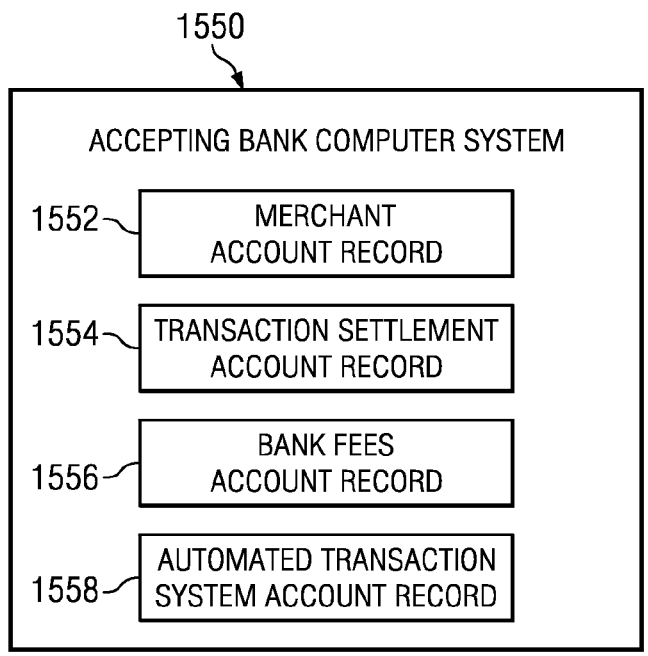
FIG. 15 is a schematic diagram illustrating an Accepting Bank computer system, in accordance with the present disclosure.

FIGS. 14 and 15 are schematic diagrams illustrating Issuing Bank and Accepting Bank computer systems 1400, 1550 for transaction settlement in the automated transaction system. If the Issuing Bank and Accepting Bank are the same bank, then records in the Issuing Bank computer system 1400 are stored at the consumer account server 385 of FIG. 3 and the records in the Accepting Bank computer system 1550 are stored at the merchant account server 383 of FIG. 3 and those servers 385, 383 are at the same financial institution. However, the Issuing Bank and Accepting Bank may be different banks, in which case the servers 385, 383 are located at different financial institutions.

Each Issuing Bank 1400 may establish and maintain an account record of a consumer identifier mechanism user 1402 (e.g., at a consumer account server 385 of FIG. 3). And each Accepting Bank 1550 may establish and maintain an account record of a merchant 1552 (e.g., at a merchant account server 383 of FIG. 3). In addition, each Issuing Bank computer system 1400 and Accepting Bank computer system 1550 will have a Transaction Settlement Account record 1404, 1554 in the name of such bank through which customer funds are processed (e.g., at the automated transaction system server 381 of FIG. 3). Each Issuing Bank system 1400 and Accepting Bank system 1550 will also have a Bank Fees Account record 1406, 1556 in the name of the Bank to hold the issuing and/or accepting fees owed to the Bank (e.g., at the automated transaction system server 381 of FIG. 3). Each Issuing Bank system 1400 and Accepting Bank system 1550 will also have an automated transaction system account record 1408, 1558 for the bank to hold the processing fees owed to the transaction platform and, in the case of a payment between financial institutions, the funds owed to the merchant and the accepting fee owed to the Accepting Bank 1550 (e.g., at the automated transaction system server 381 of FIG. 3).

For simplicity purposes, the Issuing Bank system and the Accepting Bank system are shown as two separate systems 1400, 1550 in FIGS. 14 and 15, but, as mentioned above, the Issuing Bank system and the Accepting Bank system may be used by the same entity. In that case, the Bank would establish and maintain a consumer identifier mechanism user account, a merchant account, a Transaction Settlement Account, a bank fees account, and an automated transaction system account.

For a transaction or exchange via the automated transaction system, the automated transaction platform (e.g., 302 in FIG. 3) directs the flow and transfer or money between these accounts.

Figure 16:
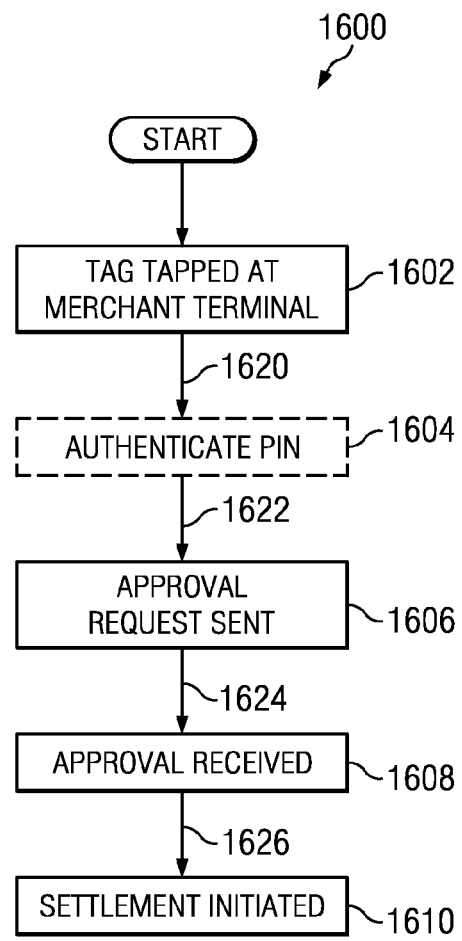
FIG. 16 is a flow diagram illustrating settlement initiation, in accordance with the present disclosure.

FIG. 16 is a flow diagram illustrating the steps preceding settlement in the automated transaction network. As discussed above, a transaction is initiated when a consumer taps their consumer identifier mechanism at the merchant terminal (step 1602). In an embodiment, the consumer identifier mechanism user's PIN number is authenticated (optional step 1604). An approval request is sent through the automated transaction platform to the Issuing Bank (step 1606). The Issuing Bank will send approval to the merchant terminal (step 1608) and, upon receipt of approval (1608), the merchant may complete or authorize the transaction and settlement can be initiated in real-time (step 1610) (although settlement may also be deferred until all amounts are settled in a batch process at a set cut-off time). At any time 1620, 1622, 1624, or 1626 prior to settlement being initiated, the merchant or consumer identifier mechanism user may cancel the transaction, in which case the steps preceding settlement are stopped and settlement is not initiated.

Figure 17:
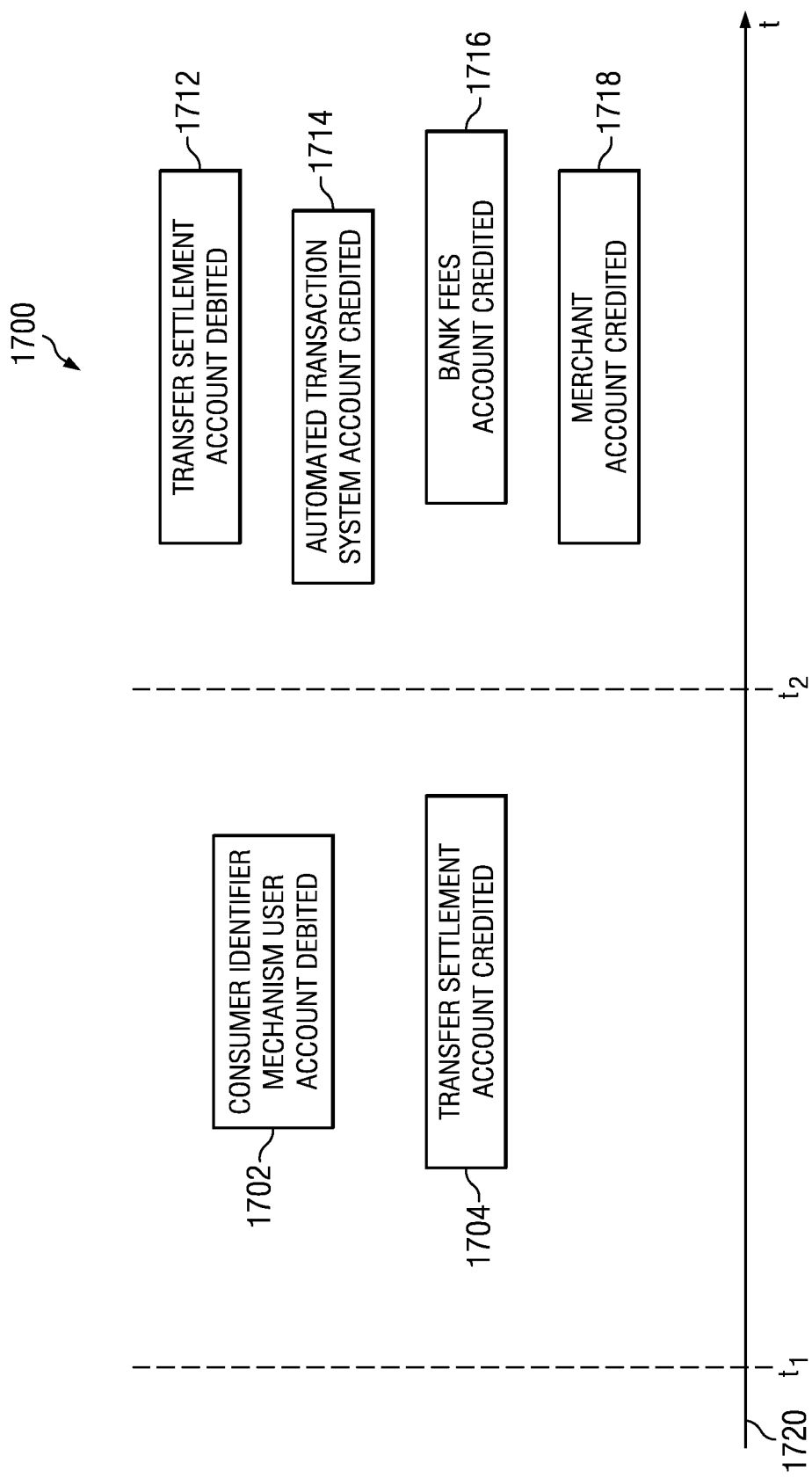
FIG. 17 is a schematic diagram illustrating intra-bank settlement, in accordance with the present disclosure.

FIG. 17 is a schematic diagram illustrating a settlement process for an intra-bank settlement 1700. An intra-bank settlement 1700 is a settlement in which the Issuing Bank and the Accepting Bank are the same Bank. The intra-bank settlement 1700 is shown on a time-line 1720 as the settlement progresses over time, t.

Following authorization of the transaction, based on directions received from the automated transaction platform, wherein the authorization of the transaction occurs at a time $t_1$, the Bank debits (or in the case of delayed batch process settlement, enters a real-time memo post against) the consumer identifier mechanism user's account 1702 in the amount of the transaction and credits the Transaction Settlement Account 1704 in the amount of the transaction. After a settlement cut-off time $t_2$, the Bank will debit the Transaction Settlement Account 1712 for the amount of the transaction. The Bank will also credit the automated transaction system account 1714 for an amount of processing fees due to the transaction platform. The Bank will also credit the Bank Fees Account 1716 for any issuing and accepting fees owed to the Bank. The Bank will also credit the merchant's designated deposit account 1718 for the amount of the transaction minus the fees charged to that merchant (which will be equal to the transaction amount less fees due to the transaction platform, Issuing Bank, and Accepting Bank).

Figure 18:
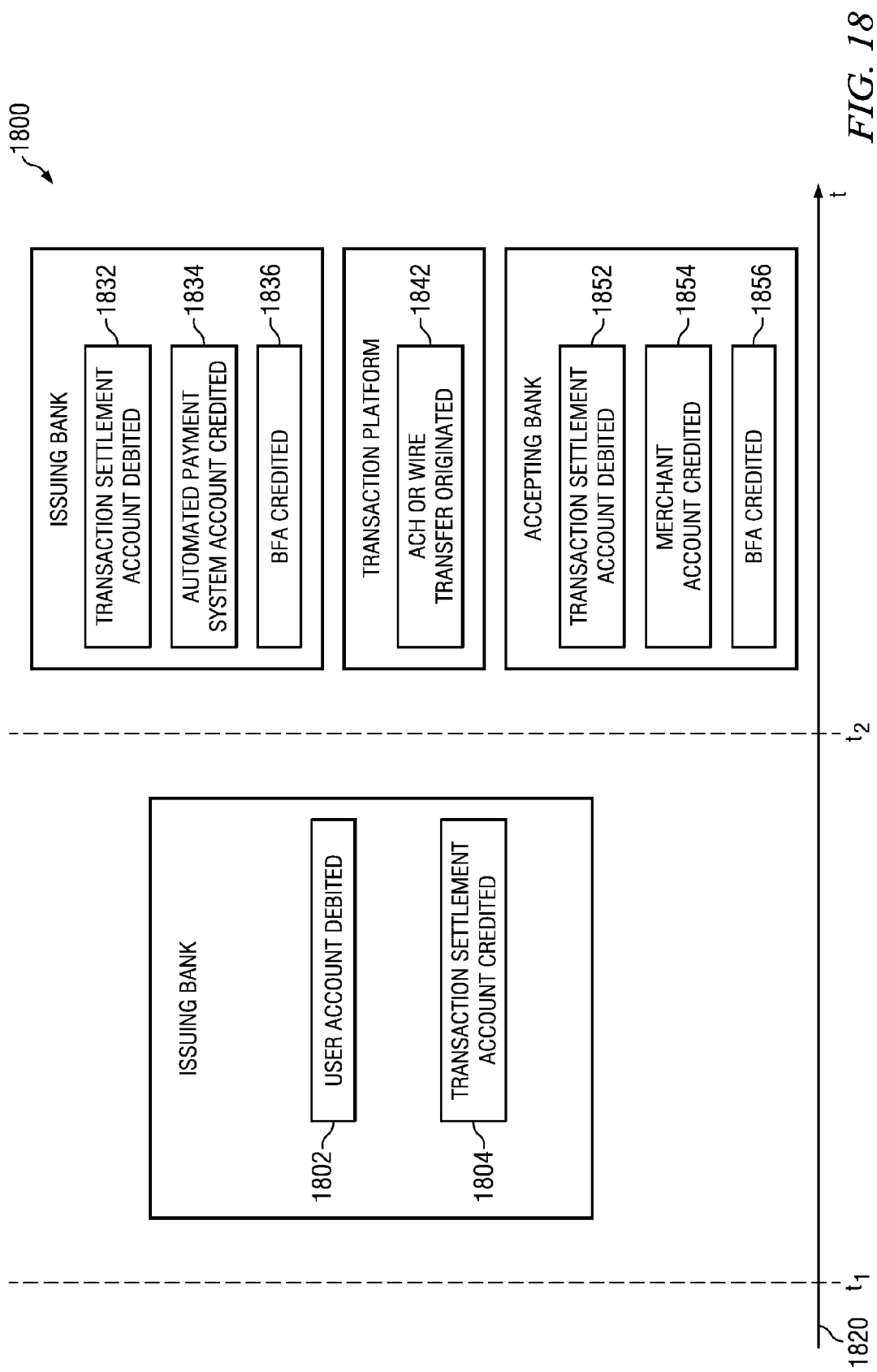
FIG. 18 is a schematic diagram illustrating inter-bank settlement, in accordance with the present disclosure.

FIG. 18 is a schematic diagram illustrating a settlement process for an inter-bank settlement 1800. An inter-bank settlement 1800 is a settlement in which the Issuing Bank and the Accepting Bank are different banks The inter-bank settlement 1800 is shown on a time-line 1820 as the settlement progresses over time, t.

Following authorization of the transaction, wherein the authorization of the transaction occurs at a time $t_1$, upon direction of the automated transaction platform, the Issuing Bank debits (or in the case of delayed batch process settlement, enters a real-time memo post against) the consumer identifier mechanism user's account 1802 in the amount of the transaction and credits the Issuing Bank's Transaction Settlement Account 1804 in the amount of the transaction.

After a settlement cut-off time $t_2$, based on directions received from the transaction platform, the Issuing Bank will debit the Transaction Settlement Account 1832 for the amount of the transaction. The Issuing Bank will also credit the Issuing Bank's Bank Fees Account 1836 for issuing fees owed to the Issuing Bank for the transaction. The Issuing Bank will also credit the automated transaction system account 1834 for processing fees due to the transaction platform as well as the amounts to be transferred to the Accepting Bank.

Also after time $t_2$, based on direction received from the transaction platform, the Accepting Bank will debit the Accepting Bank's Transaction Settlement Account 1852 for the amount of the funds to be received from the Issuing Bank, as discussed above. The Accepting Bank will also credit the Accepting Bank's Bank Fees Account 1856 for accepting fees owed to the Accepting Bank for the transaction. The Accepting Bank will also credit the automated transaction system account 1854 for processing fees due to the transaction platform. The Accepting Bank will also credit the merchant's designated deposit account 1854 by an amount equal to the transaction amount less fees due to the transaction platform, Issuing Bank, and Accepting Bank.

Periodically, the automated transaction platform will issue instructions to enable the Issuing Bank's Transaction Settlement Account to originate an ACH or wire transfer 1852 in the amount of the amounts to be transferred to the Accepting Bank to the Accepting Bank's Transaction Settlement Account. In an embodiment, the transfer is effected through ACH where (i) the Issuing Bank is the Originator, (ii) the Issuing Bank or another financial institution is the Originating Depository Financial Institution and (iii) the Accepting Bank is the Receiver and the Receiving Depository Financial Institution. In another embodiment, the transfer is effected through wire transfer and the Issuing bank is the Sender and Sender's Bank, and the Accepting Bank is the Beneficiary and the Beneficiary's Bank.

While for illustrative purposes the settlement processes described above in relation to FIGS. 17 and 18 are discussed in the context of one transaction, all transactions occurring over the automated transaction system on a calendar day before a designated cut off time in a batch process as described above, including refund transactions initiated by a merchant at the request of a consumer identifier mechanism user and charge back transactions initiated by an Issuing Bank, may be settled on a net basis.

As mentioned above in relation to FIG. 16, the consumer identifier mechanism user or the merchant may initiate on the merchant terminal cancellation of a transaction before it has settled. In an embodiment, no Bank fees are charged in the event of a cancelled transaction.

Upon request of the consumer identifier mechanism user, the merchant may also initiate a full or partial refund of a transaction that has already settled, either on the merchant terminal or through a transaction platform provided web-based merchant management console. In an embodiment, in the case of a refund, the Bank fees associated with the original transaction are not refunded, but additional Bank fees are not charged for the refund transaction.

A web-based Issuing Bank management console may also be provided by the transaction platform for Issuing Banks to log and manage consumer identifier mechanism user disputes raised by the user with the Issuing Bank. The Issuer Bank will log the transaction dispute in the management console. If the dispute has already settled, the Accepting Bank will be instructed by the transaction platform to transfer the amount of the disputed transaction from the merchant's account to the Accepting Bank's Transaction Settlement Account, pending resolution of the dispute. If the disputed transaction has not already settled, the amount of the disputed transaction will remain the Issuing Bank's Transaction Settlement Account, pending resolution of the dispute.

In an embodiment, the transaction platform may provide Banks daily and monthly reports to enable reconcilement of their automated transaction system transactions.

Open-Loop and Closed-Loop Transactions

In an embodiment, intra-bank transactions and settlement processes are referred to as closed-loop transactions and inter-bank transactions and settlement processes are referred to as open-loop transactions. This section describes in detail the flow of funds in both open-loop and closed-loop transactions, providing description for embodiments in both standard and reward-based transactions and for transaction-based and invoice-based flow of funds.

Figure 19:
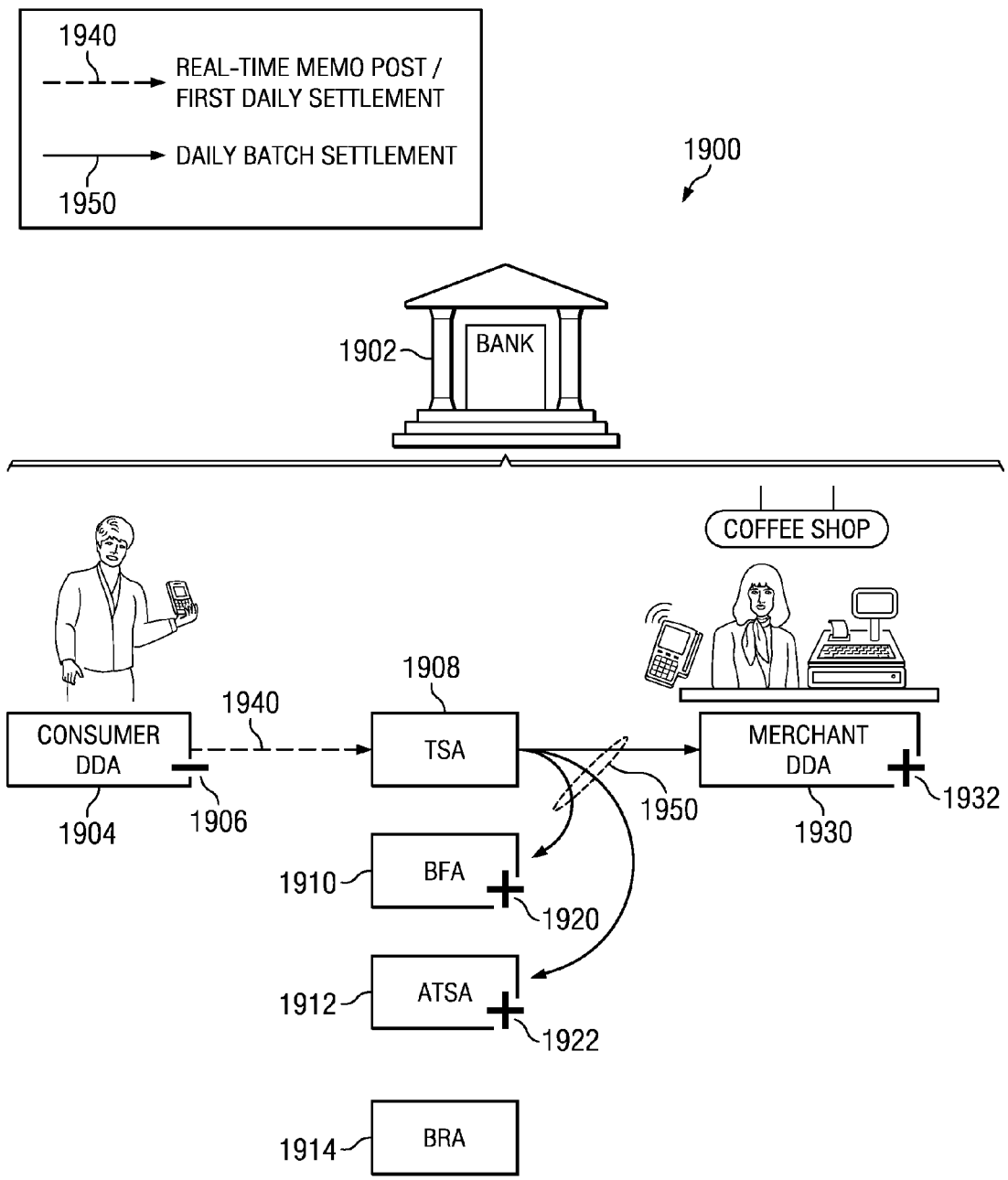
FIG. 19 is a schematic diagram illustrating intra-bank settlement, in accordance with the present disclosure.

FIG. 19 is a schematic diagram 1900 illustrating an embodiment of a closed-loop transaction settlement having no reward redemption. After a transaction is authorized at a merchant terminal, a closed loop settlement process occurs at a bank 1902 under the direction of the automated transaction platform. As discussed above in relation to FIG. 17, the consumer identifier mechanism user's account 1904 is debited 1906 by the gross transaction amount. That amount is credited to the bank's Transaction Settlement Account 1908.

In an embodiment, the debiting 1906 of the consumer identifier mechanism user's account 1904 and the crediting of the Transaction Settlement Account 1908 by the gross transaction amount occurs via real-time memo post 1940 from the consumer identifier mechanism user's demand deposit account 1904 to the bank's Transaction Settlement Account 1908. Thus, for some embodiments, the funds may flow in real-time at 1940.

In other embodiments, available funds in the consumer identifier mechanism user's demand deposit account 1904 are reserved temporarily and are transferred to the Transaction Settlement Account 1908 prior to a first daily batch settlement at 1940. In an embodiment, the first daily batch settlement 1940 is a 24-hour settlement cycle for settling consumer identifier mechanism users' demand deposit accounts to the bank Transaction Settlement Account (consumer demand deposit account→transfer settlement account) flows. A second daily batch settlement 1950 is another 24-hour settlement cycle for settling the bank Transaction Settlement Account 1908 to merchants' demand deposit accounts 1930 (transfer settlement account→merchant demand deposit account) flows. In an embodiment, the first and second daily batch settlements 1940, 1950 are synchronized so that the second daily batch settlement 1950 occurs just after the first daily batch settlement 1940, resulting in the Transaction Settlement Account 1908 being at a zero balance for a period of time after the second daily batch 1950. In another embodiment, the first and second daily batch settlements 1940, 1950 are not synchronized and, as a result, the Transaction Settlement Account 1908 may not be at a zero balance for long after the second daily batch settlement 1950.

Regardless of whether the transfer 1940 occurs in real time or as a daily settlement, during the second daily batch settlement 1950 funds from the Transaction Settlement Account 1908 are transferred to a Bank Fees Account 1910, an automated transaction system account 1912, and a merchant demand deposit account 1930.

The Bank 1902 will credit the Bank Fees Account 1910 by an amount equal to the bank issuing fees and the bank accepting fees 1920. The Bank will also credit the automated transaction system account 1912 by an amount equal to a transaction platform transaction fee 1922. In this embodiment, no reward redemption is in place so the Bank Rewards Account 1914 is neither credited nor debited. Thus, in embodiments not having reward redemption, the Bank Rewards Account 1914 may or may not be established. The Bank will also credit the merchant demand deposit account 1930 by a net amount 1932 equal to the gross transaction amount less the bank issuing fees, the bank accepting fees, and the transaction platform transaction fees.

Figure 20:
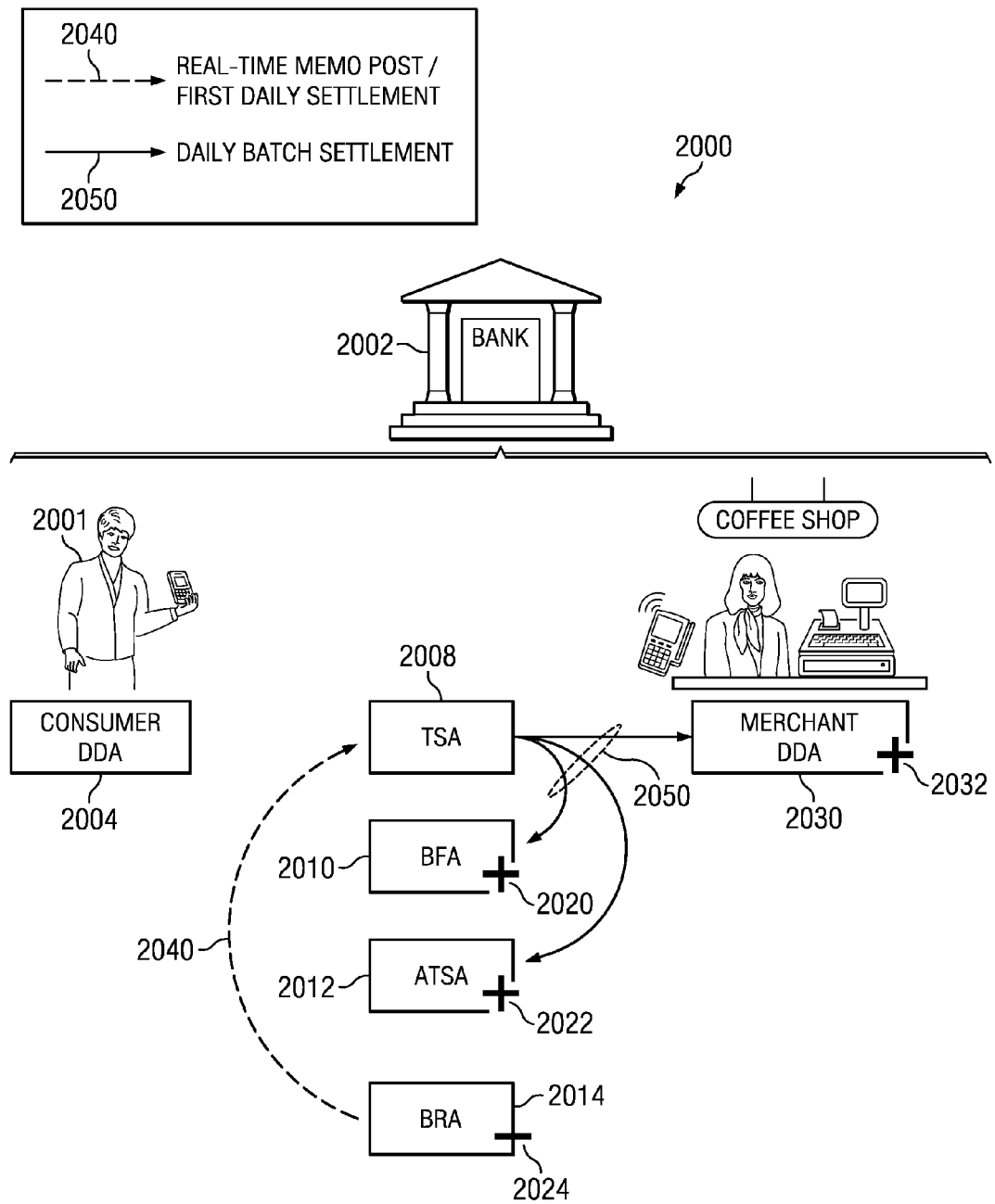
FIG. 20 is a schematic diagram illustrating intra-bank settlement, in accordance with the present disclosure.

FIG. 20 is a schematic diagram 2000 illustrating an embodiment of a closed-loop transaction settlement including financial institution reward redemption under the direction of the automated transaction platform. After the transaction is authorized at a merchant terminal, a closed-loop settlement process occurs at a bank 2002. In the illustrated embodiment, the consumer identifier mechanism user 2001 experiences a free transaction due to reward redemption from the bank 2002. Thus, the consumer identifier mechanism user's demand deposit account 2004 is not debited for the transaction. Instead, the gross transaction amount is debited 2024 from the Bank Rewards Account 2014. That amount is credited to the bank's Transaction Settlement Account 2008 at 2040.

In an embodiment, the debiting 2024 of the Bank Rewards Account 2014 and the crediting of the Transaction Settlement Account 2008 by the gross transaction amount occurs via real-time memo post 2040 from the Bank Rewards Account 2014 to the bank's Transaction Settlement Account 2008. Thus, for some embodiments, the funds may flow in real-time at 2040. During a daily batch settlement 2050, funds from the Transaction Settlement Account 2008 are transferred to a Bank Fees Account 2010, an automated transaction system account 2012, and a merchant demand deposit account 2030.

The Bank 2002 will credit the Bank Fees Account 2010 by an amount equal to the bank issuing fees and the bank accepting fees 2020. The Bank will also credit the automated transaction system account 2012 by an amount equal to a transaction platform transaction fee 2022. The Bank will also credit the merchant demand deposit account 2030 by a net amount 2032 equal to the gross transaction amount less the bank issuing fees, the bank accepting fees, and the transaction platform transaction fees.

In an embodiment (not shown), the financial institution reward may not cover the entire transaction cost. In that case, the transaction depicted in FIG. 20 may be modified to include a reduced transfer (the gross transaction amount less any financial institution reward amount) from the consumer demand deposit account 2004 and a contribution from an alternate source account (e.g., the Bank Rewards Account 2014).

Figure 21:
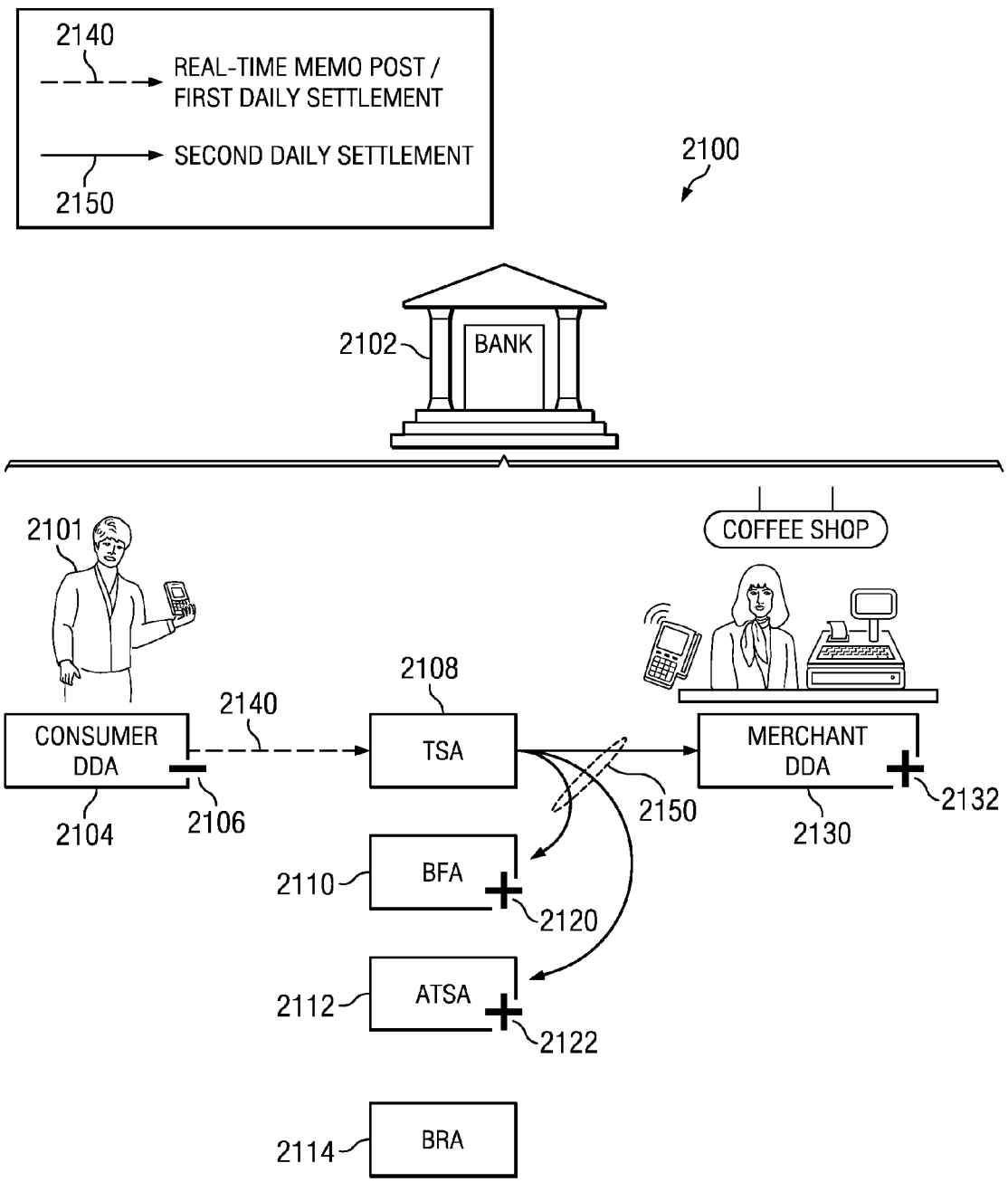
FIG. 21 is a schematic diagram illustrating intra-bank settlement, in accordance with the present disclosure.

FIG. 21 is a schematic diagram 2100 illustrating an embodiment of a closed-loop transaction settlement including merchant reward redemption under the direction of the automated transaction platform. After the transaction is authorized at a merchant terminal, a closed-loop settlement process occurs at a bank 2102. In the illustrated embodiment, the consumer identifier mechanism user 2101 experiences a reduced transaction amount due to a merchant coupon. Otherwise, the process is similar to a closed-loop, no-rewards transaction (as discussed above in relation to FIG. 19). Thus, the consumer identifier mechanism user's demand deposit account 2104 is debited 2106 by the gross transaction amount less the merchant coupon value. That amount is credited to the bank's Transaction Settlement Account 2108.

In an embodiment, the debiting 2106 of the consumer identifier mechanism user's account 2104 and the crediting of the Transaction Settlement Account 2108 by the gross transaction amount occurs via real-time memo post 2140 from the consumer identifier mechanism user's demand deposit account 2104 to the bank's Transaction Settlement Account 2108. Thus, for some embodiments, the funds may flow in real-time at 2140.

In other embodiments, available funds in the consumer identifier mechanism user's demand deposit account 2104 are reserved temporarily and are transferred to the Transaction Settlement Account 2108 prior to a first daily batch settlement at 2140. In an embodiment, the first daily batch settlement 2140 is a 24-hour settlement cycle for settling consumer identifier mechanism users' demand deposit accounts to the bank Transaction Settlement Account (consumer demand deposit account transfer settlement account) flows. A second daily batch settlement 2150 is another 24-hour settlement cycle for settling the bank Transaction Settlement Account 2108 to merchants' demand deposit accounts 2130 (transfer settlement account→merchant demand deposit account) flows. In an embodiment, the first and second daily batch settlements 2140, 2150 are synchronized so that the second daily batch settlement 2150 occurs just after the first daily batch settlement 2140, resulting in the Transaction Settlement Account 2108 to be at a zero balance for a period of time after the second daily batch 2150. In another embodiment, the first and second daily batch settlements 2140, 2150 are not synchronized and, as a result, the Transaction Settlement Account 2108 may not be at a zero balance for long after the second daily batch settlement 2150.

Regardless of whether the transfer 2140 occurs in real time or as a daily settlement, during the second daily batch settlement 2150 funds from the Transaction Settlement Account 2108 are transferred to a Bank Fees Account 2110, an automated transaction system account 2112, and a merchant demand deposit account 2130.

The Bank 2102 will credit the Bank Fees Account 2110 by an amount equal to the bank issuing fees and the bank accepting fees 2120. The Bank will also credit the automated transaction system account 2112 by an amount equal to a transaction platform transaction fee 2122. In this embodiment, a bank reward redemption is not in place so the Bank Rewards Account 2114 is neither credited nor debited. Thus, in embodiments not having reward redemption, the Bank Rewards Account 2114 may or may not be established. The Bank will also credit the merchant demand deposit account 2130 by a net amount 2132 equal to the gross transaction amount less the bank issuing fees, the bank accepting fees, the transaction platform transaction fees, and the merchant coupon amount.

In another embodiment, a single transaction may include both a merchant coupon and financial institution reward point redemption. In this embodiment, an alternate source account (e.g., the Bank Rewards Account 2014 in FIG. 20) and a reduced value (e.g., the gross transaction amount less the coupon value 2106 in FIG. 21) may be used to modify the basic flow of FIG. 19.

Figure 22:
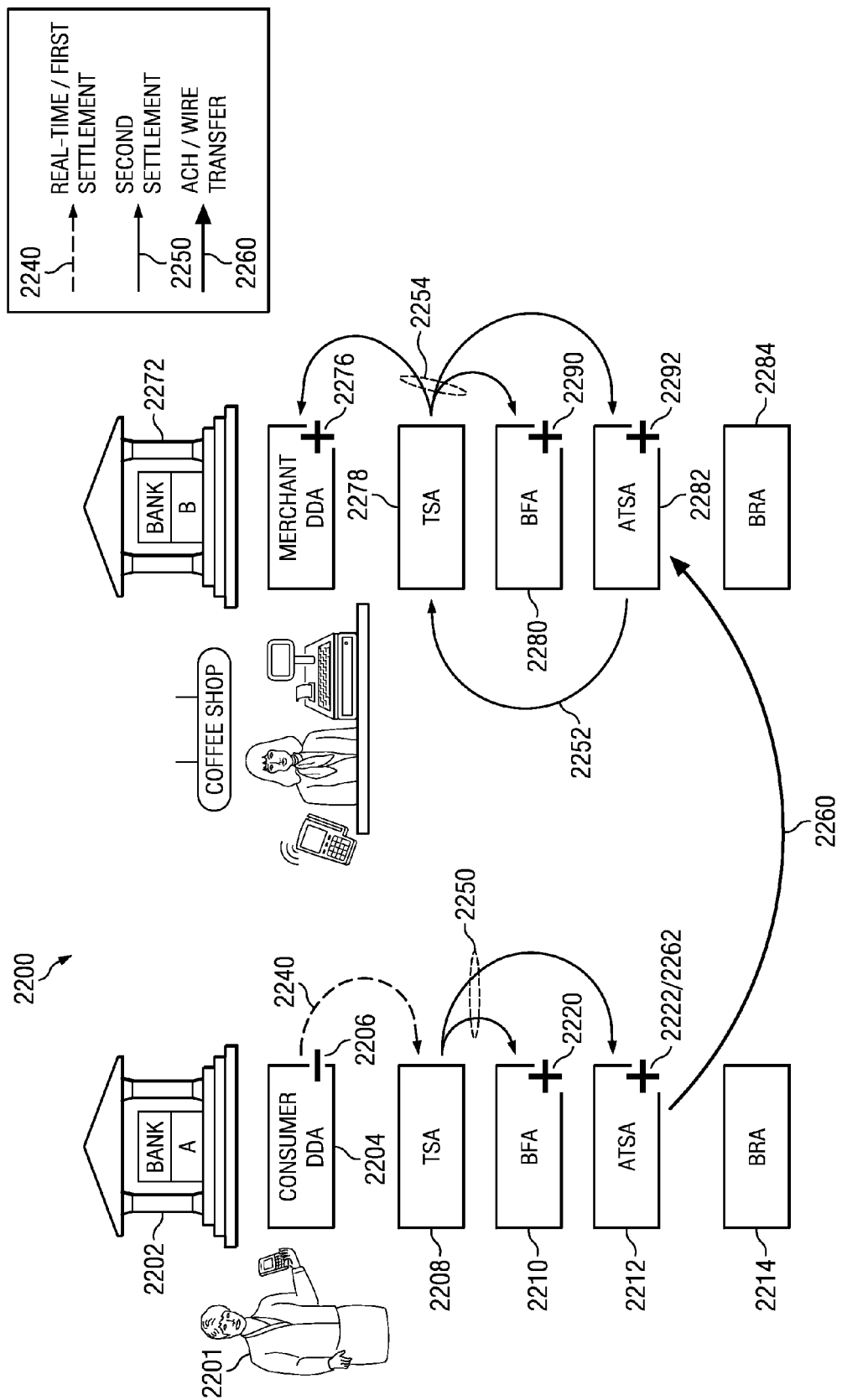
FIG. 22 is a schematic diagram illustrating inter-bank settlement, in accordance with the present disclosure.

FIG. 22 is a schematic diagram 2200 illustrating an embodiment of a open-loop transaction settlement without reward redemption under the direction of the automated transaction platform. After the transaction is authorized at a merchant terminal, an open-loop settlement process occurs between an Issuing Bank 2202 and an Accepting Bank 2272. In the illustrated embodiment, the consumer identifier mechanism user's 2201 demand deposit account 2204 is debited 2206 by the gross transaction amount. That amount is credited at 2240 to the Issuing Bank's Transaction Settlement Account 2208. In an embodiment, the gross transaction amount is credited at 2240 to the Issuing Bank's Transaction Settlement Account 2208 via real-time memo post.

In other embodiments, available funds in the consumer identifier mechanism user's demand deposit account 2204 are reserved temporarily and are transferred to the Issuing Bank's Transaction Settlement Account 2208 prior to a first daily batch settlement at 2240. In an embodiment, the first daily batch settlement at 2240 is a 24-hour settlement cycle for settling consumer identifier mechanism users' demand deposit accounts 2204 to the Issuing Bank Transaction Settlement Account 2208 (consumer demand deposit account transfer settlement account) flows. A second daily batch settlement 2250 is another 24-hour settlement cycle for settling the Issuing Bank Transaction Settlement Account 2208 to the Issuing Bank's Bank Fees Account 2210 and the Issuing Bank automated transaction system account 2212 (transfer settlement account→bank fees account and automated transaction system account) flows. In an embodiment, the first and second daily batch settlements 2240, 2250 are synchronized so that the second daily batch settlement 2250 occurs just after the first daily batch settlement 2240, resulting in the Transaction Settlement Account 2208 to be at a zero balance for a period of time after the second daily batch 2250. In another embodiment, the first and second daily batch settlements 2240, 2250 are not synchronized and, as a result, the Transaction Settlement Account 2208 may not be at a zero balance for long after the second daily batch settlement 2250.

Regardless of whether the transfer 2240 occurs in real time or as a daily settlement, during the second daily batch settlement 2250 funds from the Issuing Bank's Transaction Settlement Account 2208 are transferred to the Issuing Bank's Bank Fees Account 2210 and the Issuing Bank automated transaction system account 2212.

The Issuing Bank 2202 will credit the Issuing Bank's Bank Fees Account 2210 by an amount equal to the bank issuing fees 2220. The Issuing Bank will also credit the Issuing Bank automated transaction system account 2212 by an amount equal to a first intermediate amount 2222. The first intermediate amount 2222 includes the gross transaction amount less the bank issuing fee. The first intermediate amount 2222 is also equivalent to the net amount 2276 (the amount to be ultimately received at the merchant demand deposit account 2274) plus the Bank Accepting Fee 2290 (the fee to be credited to the Accepting Bank) plus the automated transaction system account fee 2262, 2292 (the amount that the Issuing Bank and Accepting Bank automated transaction system account will end up with after all transfers and settlement), resulting in a net positive flow.

In the embodiments depicted by FIG. 22, a bank reward redemption is not in place so the Bank Rewards Accounts 2214, 2284 are neither credited nor debited. Thus, in embodiments not having reward redemption, the Bank Rewards Accounts 2214, 2284 may or may not be established. The embodiments depicted by FIG. 22 may be adapted to include a bank reward redemption or merchant coupons (as described in relation to FIGS. 20 and 21).

As discussed above, in an open-loop transaction 2200, the Issuing Bank 2202 and the Accepting Bank 2272 are different banks. Thus, the funds may be transferred 2260 from the Issuing Bank 2202 to the Accepting Bank 2272. As discussed above in relation to FIG. 18, the transfer of funds 2260 may be effected via ACH (automated clearing house) or wire transfer. Either way, the transfer 2260 includes the net amount 2276 plus the bank accepting fees 2290 plus the automated transaction system accepting fee 2292. Thus, the Issuing Bank automated transaction system account is left with the automated transaction system account issuing fee 2262 after the transfer 2260 occurs. The net amount 2276 plus the bank accepting fees 2290 plus the automated transaction system accepting fee 2292 are credited to the Accepting Bank automated transaction system account 2282 at the transfer 2260, resulting in a net negative flow.

The net amount 2276, the bank accepting fees 2290, and the automated transaction system accepting fee 2292 are then debited from the Accepting Bank automated transaction system account 2282 and credited to the Accepting Bank's Transaction Settlement Account 2278 (shown by arrow 2252). Then the Accepting Bank's Transaction Settlement Account 2278 is debited and the merchant's demand deposit account 2274, the Accepting Bank's Bank Fees Account 2280, and the Accepting Bank automated transaction system account 2282 are credited in the Accepting Bank's 2272 daily batch settlement 2254 by the net amount 2276, the bank accepting fees 2290, and the automated transaction system accepting fee 2292 (respectively).

Monthly Invoice Collection

In an embodiment, the automated transaction system may generate periodic financial institution and merchant invoices and may collect from financial institutions and merchants periodically.

Figure 23:
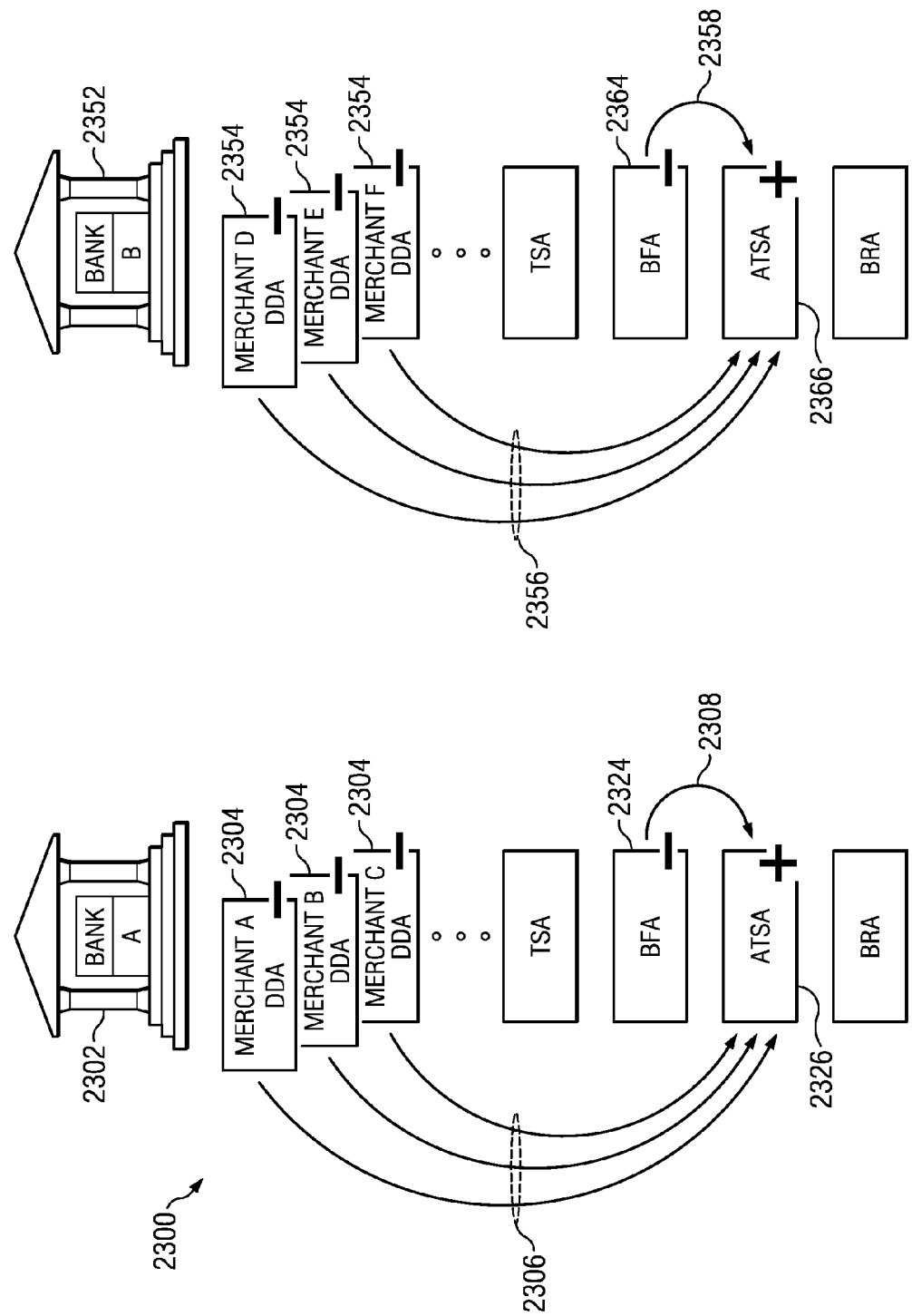
FIG. 23 is a schematic diagram illustrating periodic invoicing and collection, in accordance with the present disclosure.

FIG. 23 is a schematic diagram illustrating an embodiment of automated transaction system invoice and collection 2300 under the direction of the automated transaction platform. At the banks participating in the automated transaction system, the automated transaction platform may generate invoices for each participating merchant associated with that bank as well as for the financial institution itself. For example, for bank 2302, the automated transaction platform may generate merchant invoices for merchants A, B, C, etc. associated with bank 2302. The automated transaction platform may collect invoice amounts by the merchants A, B, C, etc. accounts 2304 each being debited by the merchant invoice amounts 2306, the Bank Fees Account 2324 being debited by the financial institution invoice amount 2308 and the automated transaction system account 2326 being credited by the sum of the merchant invoice amounts 2306 and the financial institution invoice amount 2308.

Similarly, for bank 2352, the automated transaction platform may generate merchant invoices for merchants D, E, F, etc. associated with bank 2352. The automated transaction platform may collect invoice amounts by the merchants D, E, F, etc. accounts 2354 each being debited by the merchant invoice amounts 2356, the Bank Fees Account 2364 being debited by the financial institution invoice amount 2358 and the automated transaction system account 2366 being credited by the sum of the merchant invoice amounts 2356 and the financial institution invoice amount 2358.

FIG. 24 is a table 2400 summarizing the above mentioned accounts 2420 and their purpose(s) 2422, in-flows 2424, and out-flows 2426, under the direction of the automated transaction platform. The various accounts mentioned above include the transaction settlement account 2402, the bank fees account 2404, the automated transaction system account 2406, and the bank rewards account 2408.

Dispute Resolution

FIG. 25 is a flow diagram 2500 illustrating dispute resolution for the automated transaction system. In an embodiment, when a consumer is concerned about a specific transaction, they may report the transaction 2502 to their issuing financial institution.

Next, a customer service representative at the financial institution will flag disputed transactions 2504 in a management console. If a transaction has not yet settled at the time of reporting 2502, the transaction will be flagged at 2504 and the transaction will not settle and the funds will be held in the transfer settlement account. If the transaction has already settled at the time of reporting 2502, then the transaction will be flagged at 2504, the funds will be debited from the merchant account for the total amount of the transaction, and the funds will be held at the transfer settlement account. In an embodiment, the merchant account will be debited a greater amount than the funding received by the merchant account originally (the difference representing the issuing fees and the fees funded by the merchant in the disputed transaction).

Next, the customer service representative assigned to the disputed transaction in question will log the dispute 2506. In an embodiment, the customer service representative will select "log dispute activity" from the management console during the logging step 2506. In an embodiment, during the logging step 2506, the customer service representative will enter comments or case notes.

Next, the customer service representative assigned to the disputed transaction will investigate the transaction 2508. Once the investigation 2508 is complete, the customer service representative will resolve the dispute 2510. In an embodiment, the customer service representative selects "resolve dispute" from the management console during the resolving step 2510. If the dispute is resolved in favor of the merchant, the merchant funds will be credit to the merchant account from the transfer settlement account. If the dispute is resolved in favor of the consumer, the entire purchase amount is credited to the consumer account from the transfer settlement account.

Rewards and Points

Referring back to FIG. 2, in an embodiment, the automated transaction service offers participating financial institutions 203 rewards programs to promote the use of consumer identification mechanisms 201, merchant terminals 205, and to drive local merchant loyalty. The rewards programs are fully integrated into the transaction platform system 210. The automated transaction service administers the programs for participating financial services 203.

A rewards points program allows consumers to purchase goods and services with dollars using the consumer identification mechanism 201 and earn points or other credit, which is funded by the financial institution or merchant. The number of visits or dollars spent by a consumer earns the consumer points.

Rewards can be obtained by a consumer online via a platform hosted on the Internet (e.g., Facebook) or by sending an SMS containing a unique identifier or by using a consumer access mechanism at a merchant terminal.

Rewards can be redeemed by a consumer by sending an SMS containing a unique identifier which notifies the merchant (either with a message on the merchant terminal or by printing a coupon at the merchant terminal) or by tapping a consumer access mechanism at a merchant terminal.

Financial institutions 203 or merchants 205 fund (or purchase) points at a predetermined "earn rate." For example, $X of consumer spending could equal Y points. The party funding the rewards 203 determines the earn rate for points (or the ratio of consumer dollars spent to rewards points earned).

The automated transaction service then deducts the cost of the points from the daily net settlement of fees distributed to the participating financial institution 203. The dollar amount of the cost of the rewards that is deducted will be placed into an escrow account to eventually fund the purchase of goods and services at the merchant terminal 205. The participating financial institution may open an account to hold and fund consumer purchases.

Consumers are then eligible to redeem rewards at the merchant terminal 205 to obtain goods and services. Consumers are prompted to use points to obtain goods and services when a sufficient balance of points is available at the merchant terminal 205. In an embodiment, the automated transaction service sends an SMS message to a consumer's cellular phone indicating the amount of points available. Points spent at the merchant terminal 205 are automatically deducted from the consumer points account balance and the automated transaction service will fund the transaction from the issuing financial institution 203 rewards account balance.

Participating financial institutions 203 and/or consumers may also elect to pool reward points earned by consumers and to donate them to a non-profit or charity. In the case of redeeming points for charity, consumers with a financial institution 203 spend dollars that collectively earn points for a pre-selected charity. In an embodiment, the charity is selected by the financial institution 203. In another embodiment, the charity is selected by the consumer. Financial institutions 203 exchange a point balance for a cash donation when the point balance reaches a pre-determined level. Point balances build based on the earn rate established by each participating financial institution 203.

Merchants are eligible to enroll in a Merchant Rewards Program in which consumers are rewarded based on the number of transactions or amount spent at a participating merchant terminal 205. In an embodiment, the merchant determines the number of transactions (or credits) for eligibility for a consumer to receive a discount. In another embodiment, the merchant determines the dollar amount of the discount. The credits earned by consumers are tracked in the automated transaction platform.

Merchants are not required to pre-fund the consumer purchase discount amount, but should fund issuing fees and automated transaction service fees following the discounted transaction. In the case of discounted transactions, the merchant account is debited for the amount of the transaction issuing fees and automated transaction service fees.

Disrupted Communication, Reporting, Reconciliation

In the event communication to-and-from the transaction platform 210 is temporarily unavailable at the merchant terminal 205, or if a merchant terminal 205 does not receive an authorization or decline message from the transaction platform 210, the device will initiate a designated number of additional authorization attempts. After these attempts without a positive or negative response, the merchant terminal 205 will initiate a reversal transaction. Until the merchant terminal 205 receives an active response from the transaction platform 210, the merchant terminal 205 will no longer accept transactions. In an embodiment, a merchant may "stand-in" for transactions on behalf of a participating financial institution.

Daily and monthly reports are available to financial institutions 203 via a management console (shown in FIG. 4). The reports include transaction detail reports, segment reports, and summary reports. The intended audience includes product managers, settlement operational managers, customer service managers, and finance managers engaged in managing the debit portfolio. The reports enable portfolio analysis, account reconciliation, and segregation of revenues. Reports are highly customizable and may be delivered through the automated transaction service management console.

By design, transaction reconciliation is made simple using the three automated transaction service accounts (discussed above in relation to FIG. 10) and reporting provided in the automated transaction service management console. Participating financial institutions are able to reconcile the transfer settlement account and bank fees account accounts daily using reports provided in the management console. Daily reconciliation of the transfer settlement account and bank fees account balances is recommended. Reconciliation services may be provided by participating financial institutions 210 or by the automated transaction service.

Although the automated transaction system settlement, open- and close-loop transactions, and monthly invoice collection processes discussed above refer to financial institutions, credit unions, and other depository institutions, the automated transaction system may be adapted for other types of participants including for types of program managers (e.g., a frequent flyer mileage program manager) desiring to facilitate transactions or exchanges among their customers.

While various embodiments have been described above, it should be understood that they have been presented by way of example only, and not limitation. Thus, the breadth and scope of a preferred embodiment should not be limited by any of the above described exemplary embodiments, but should be defined only in accordance with the claims and their equivalents for any patent that issues claiming priority from the present application.

For example, as referred to herein, a machine or engine may be a virtual machine, computer, node, instance, host, or machine in a networked computing environment. Also as referred to herein, a networked computing environment is a collection of machines connected by communication channels that facilitate communications between machines and allow for machines to share resources. Also as referred to herein, a server is a machine deployed to execute a program operating as a socket listener and may include software instances.

Resources may encompass any types of resources for running instances including hardware (such as servers, clients, mainframe computers, networks, network storage, data sources, memory, central processing unit time, scientific instruments, and other computing devices), as well as software, software licenses, available network services, and other non-hardware resources, or a combination thereof.

A networked computing environment may include, but is not limited to, computing grid systems, distributed computing environments, cloud computing environment, etc. Such networked computing environments include hardware and software infrastructures configured to form a virtual organization comprised of multiple resources which may be in geographically disperse locations.

While communication protocols may be described herein, the coverage of the present application and any patents issuing there from may extend to other local-area network, wide-area network, or other network operating using other communications protocols.

Services and applications are described in this application using those alternative terms. Services can be java services or other instances of operating code. A service/application is a program running on a machine or a cluster of machines in a networked computing environment. Services may be transportable and may be run on multiple machines and/or migrated from one machine to another.

Various terms used herein have special meanings within the present technical field. Whether a particular term should be construed as such a "term of art," depends on the context in which that term is used. "Connected to," "in communication with," or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

While specific software packages are described herein, it should be understood that such applications running on servers, or through distributed web applications, servlets, or other software implementations function practically as particular machines in a the described embodiments. In many described instances, underlying data is representative of real-world items, and operations on such data are transformative of that data. The described embodiments are practical applications and are implemented on real-world machines having hardware, software, and firmware elements. References to particular software packages or firmware releases should be understood to include all version of such packages or releases.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A method implemented on a computer server in an automatic transaction processing service for settling contactless consumer transactions at a merchant, the method comprising:

providing a contactless consumer identifier mechanism to a financial institution for issuance to a consumer associated with the financial institution, the contactless consumer identifier mechanism including a dynamic identifier whereby the dynamic identifier contains no static consumer identity information, the dynamic identifier comprising a first key and a second key, the first key comprising a unique identification number associated with the consumer identifier mechanism, the second key comprising a first dynamic identification number, wherein the unique identification number and the first dynamic identification number are used for authenticating a contactless transaction between the contactless consumer identifier mechanism and a contactless terminal reader;

providing the contactless terminal reader for use at a merchant terminal, the contactless terminal reader reading the first key and the second key, and after reading the first key and the second key, transmitting a second dynamic identification number to the consumer identifier mechanism for replacing the first dynamic identification number in the contactless consumer identifier mechanism with the second dynamic identification number, wherein the unique identification number and the second dynamic identification number are used for authenticating a subsequent contactless transaction between the contactless consumer identifier mechanism and the contactless terminal reader or a different contactless terminal reader at a different merchant terminal;

receiving, at the computer server in the automatic transaction processing service, the contactless transaction from the merchant terminal, the contactless transaction having a gross transaction amount, and the contactless transaction being dynamically associated with the consumer by the dynamic identifier;

assessing, at the computer server in the automatic transaction processing service, an issuing fee payable to the financial institution associated with the consumer for the contactless transaction;

assessing, at the computer server in the automatic transaction processing service, a processing fee to be retained by the automatic transaction processing service for the contactless transaction, wherein the processing fee is debited from the gross transaction amount for the contactless transaction; and directing, at the computer server in the automatic transaction processing service, an accepting fee to a financial institution that is associated with the merchant, the accepting fee being an amount equal to the gross transaction amount for the contactless transaction debited by at least the processing fee.

2. The method according to claim 1, wherein the financial institution associated with the consumer is the same financial institution that is associated with the merchant.

3. The method according to claim 2, wherein directing the accepting fee to the financial institution comprises directing a larger payment in settlement of the contactless transaction than if the financial institution associated with the consumer is different from the financial institution associated with the merchant.

4. The method according to claim 1, wherein the contactless transaction comprises at least two contactless transactions.

5. The method according to claim 1, wherein providing the contactless terminal reader for use at the merchant terminal comprises providing computer-implemented instructions stored on a computer medium at an existing point-of-sale terminal.

6. The method according to claim 1, wherein the contactless consumer identifier mechanism comprises a near-field communications chip.

7. A method for authenticating a transaction, the method comprising:

accessing a first key and a second key in an identifier mechanism;

when conducting a first transaction:
transmitting the first key from the identifier mechanism to a first terminal reader; and
transmitting the second key from the identifier mechanism to the first terminal reader, wherein the first transaction is authenticated based on the first key and the second key;

receiving a third key from the terminal reader, wherein the second key in the identifier mechanism is replaced with the third key;

when conducting a second transaction:
transmitting the first key from the identifier mechanism to the first terminal reader or a second terminal reader; and
transmitting the second key from the identifier mechanism to the first terminal reader or the second terminal reader, wherein the second transaction is authenticated based on the first key and the third key.

8. A method for authenticating a transaction, the method comprising:

receiving, at a terminal reader, a first key from an identifier mechanism, wherein the first key is stored in the identifier mechanism;

receiving, at the terminal reader, a second key from the identifier mechanism, wherein the second key is stored in the identifier mechanism, wherein a first transaction conducted between the terminal reader and the identifier mechanism is authenticated based on the first key and the second key received by the terminal reader; and transmitting, from the terminal reader to the identifier mechanism, a third key, wherein the second key stored in the identifier mechanism is replaced with the third key, wherein a second transaction conducted between the terminal reader, or a second terminal reader, and the identifier mechanism is authenticated based on the first key and the third key received by the terminal reader or the second terminal reader.

* * * * *